United States Patent [19]
Shibuya

[11] Patent Number: 5,168,557
[45] Date of Patent: Dec. 1, 1992

[54] INSTRUCTION PREFETCHING DEVICE HAVING A HISTORY TABLE FOR MEMORIZING PAGE LAST REAL INSTRUCTION ADDRESSES AND PAGE-OVER ALL REAL INSTRUCTION ADDRESSES PROVIDING FOR QUICKER PAGE-OVER PROCESSING TIME

[75] Inventor: Toshiteru Shibuya, Tokyo, Japan
[73] Assignee: NEC Corporation, Tokyo, Japan
[21] Appl. No.: 410,577
[22] Filed: Sep. 21, 1989
[30] Foreign Application Priority Data
Sep. 21, 1988 [JP] Japan ............... 63-234903
[51] Int. Cl.[5] .................. G06F 9/32; G06F 12/10
[52] U.S. Cl. .................. 395/375; 364/255.7; 364/262.5; 364/263.1; 364/261.4; 364/938.3; 364/948; 364/955.5; 364/960.1; 364/DIG. 1; 395/400
[58] Field of Search .......... 395/375, 400, 425; 364/200 MS File, 900 MS File

[56] References Cited

U.S. PATENT DOCUMENTS

| 4,218,743 | 8/1980 | Hoffman et al. | 364/200 |
|---|---|---|---|
| 4,498,146 | 2/1985 | Martinez | 364/900 |
| 4,594,659 | 6/1986 | Guenthner et al. | 364/200 |
| 4,680,700 | 7/1987 | Hester et al. | 364/200 |
| 4,691,277 | 9/1987 | Kronstadt et al. | 364/200 |
| 4,757,438 | 7/1988 | Thatte et al. | 364/200 |
| 4,797,810 | 1/1989 | McEntee et al. | 364/200 |

Primary Examiner—Thomas C. Lee
Assistant Examiner—Ken S. Kim
Attorney, Agent, or Firm—Sughrue, Mion, Zinn, Macpeak & Seas

[57] ABSTRACT

In an instruction prefetching device for use in a data processing system, a history table (26) serves not only as a branch history table for memorizing branch predictions but also as a page-over history table for memorizing page-over information. Even when a prefetch real instruction address coincides in an instruction address register 23 with one of page last real instruction addresses, the history table produces a table hit signal and a page-over real instruction address which corresponds to the prefetch real instruction address in the page-over information kept in the history table. Responsive to the table hit signal, an instruction prefetch control circuit (28) supplies, in cooperation with a request address selector (24), the instruction address register with the page-over real instruction address as a next succeeding real instruction address which next follows the prefetch real instruction address to make an instruction memory circuit (21) produce a page-over instruction addressed by the page-over real instruction address.

2 Claims, 18 Drawing Sheets

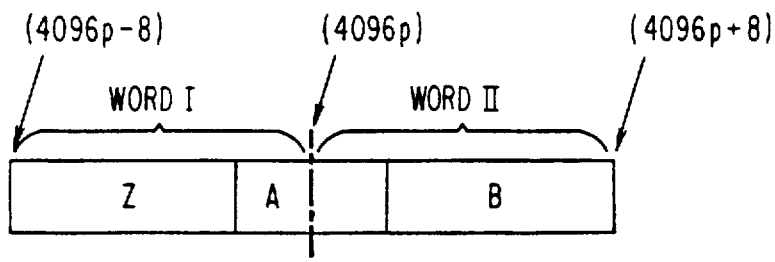
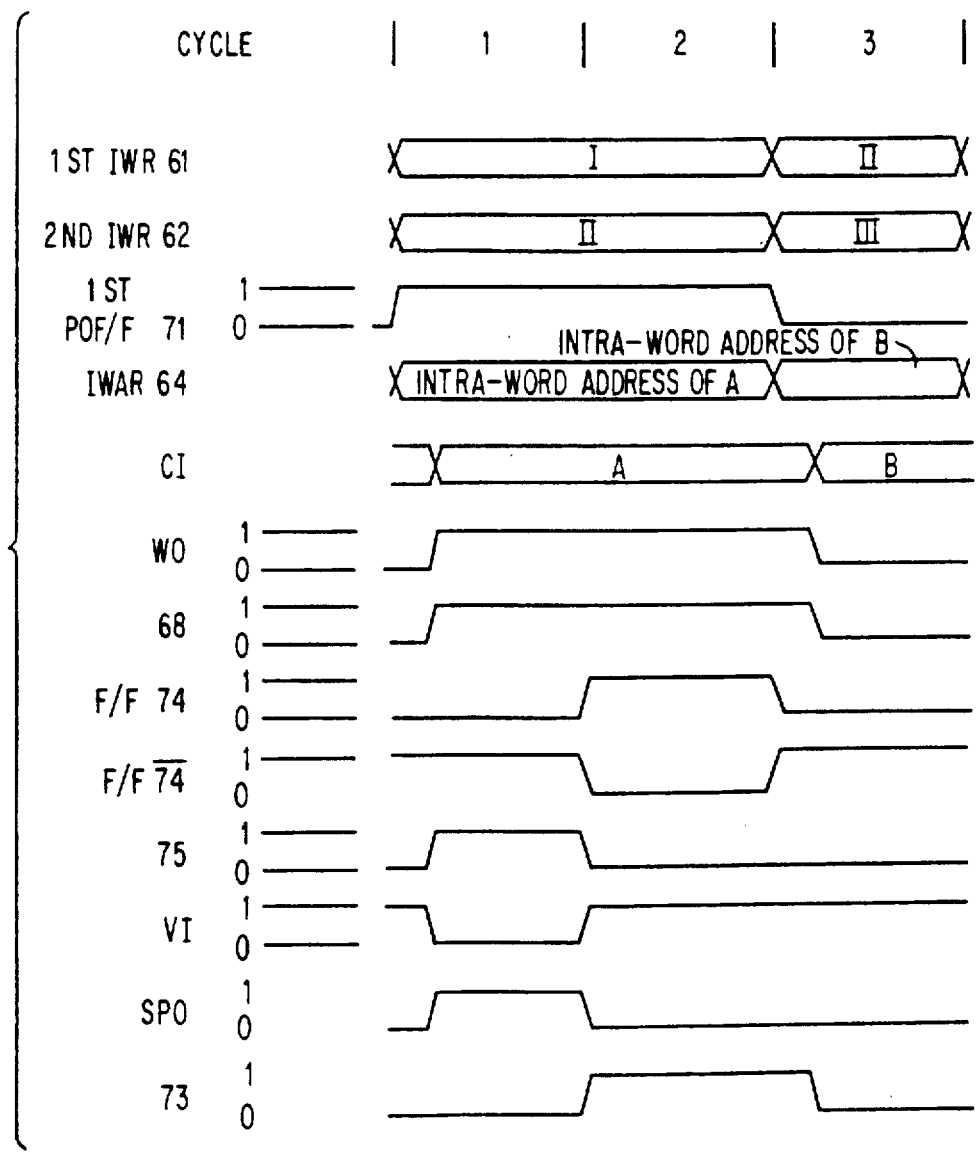

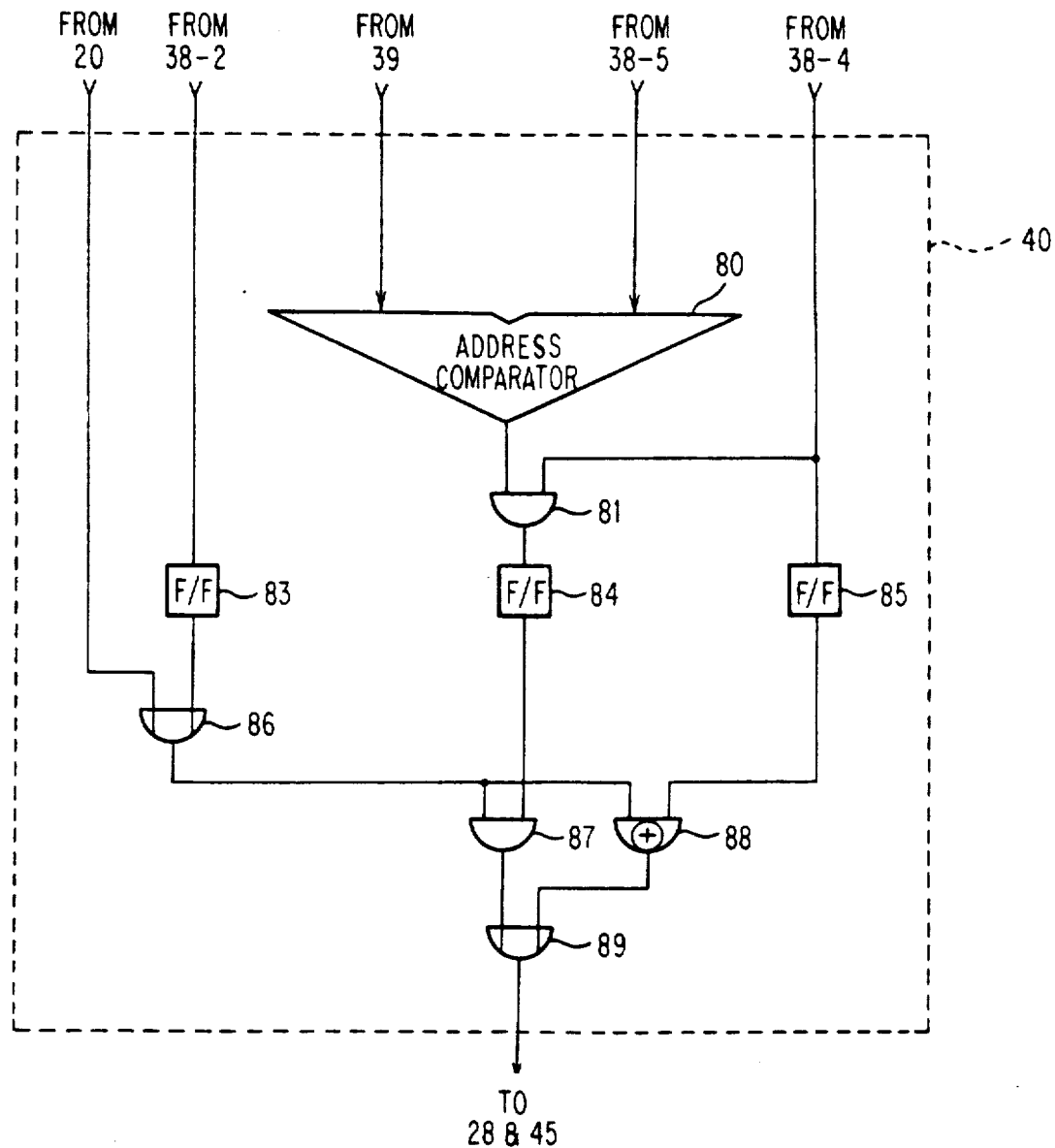

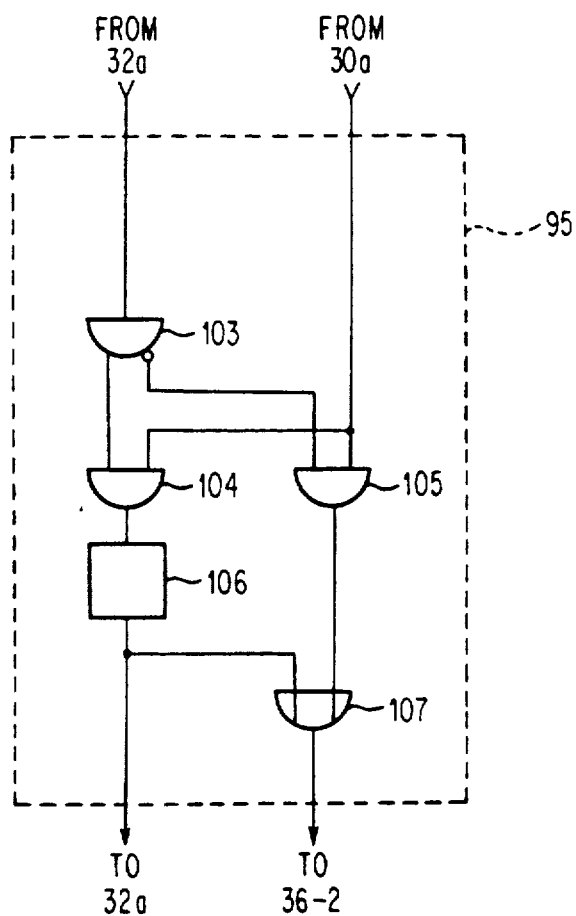

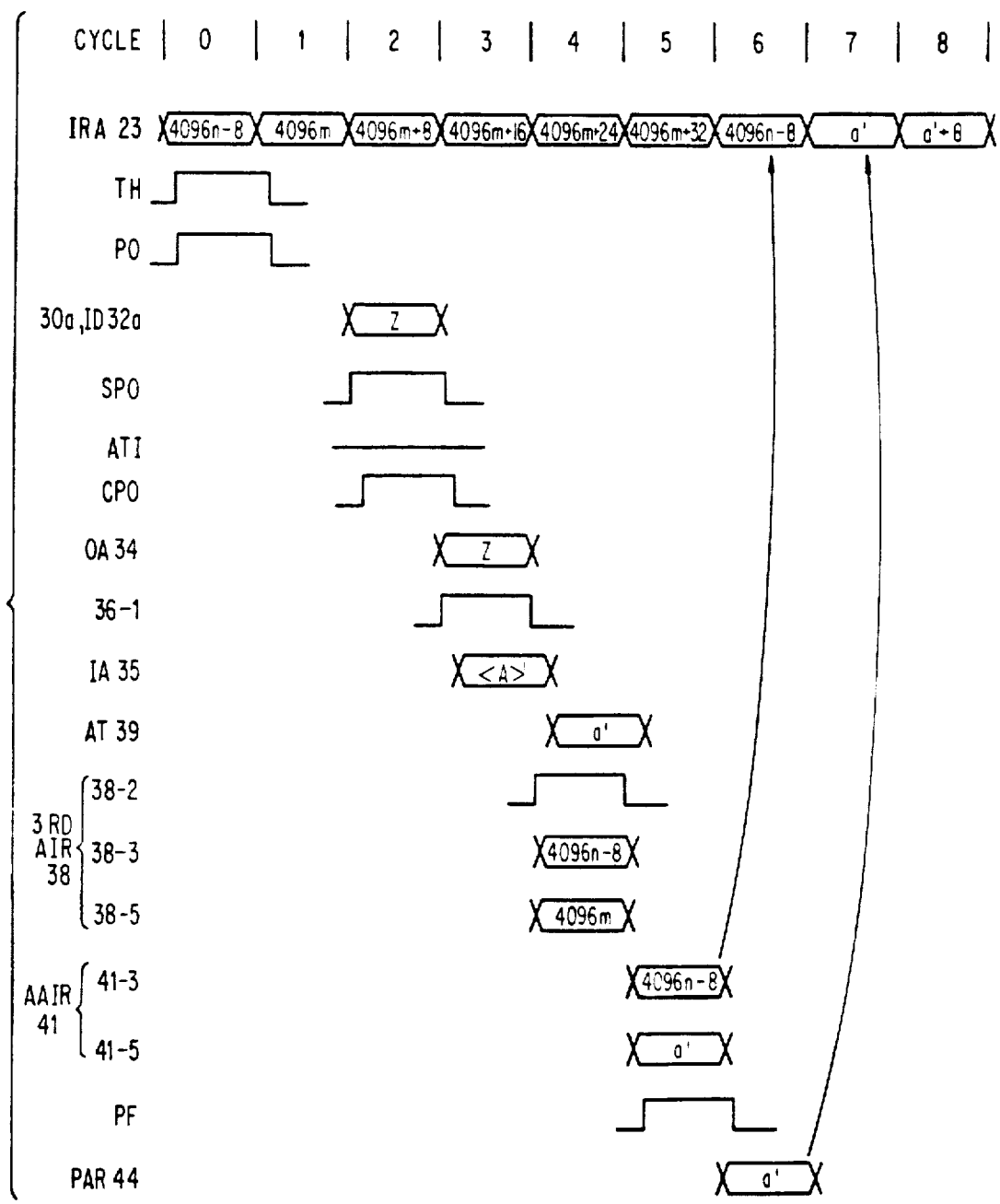

INSTRUCTION PREFETCHING DEVICE HAVING A HISTORY TABLE FOR MEMORIZING PAGE LAST REAL INSTRUCTION ADDRESSES AND PAGE-OVER ALL REAL INSTRUCTION ADDRESSES PROVIDING FOR QUICKER PAGE-OVER PROCESSING TIME

BACKGROUND OF THE INVENTION

This invention relates to an instruction prefetching device for use in a data processing system.

A data processing system usually includes an instruction prefetching device. Various instruction prefetching devices are already known. For example, an instruction prefetching device is revealed in U.S. patent application Ser. No. 552,223 filed Nov. 16, 1983, now abandoned, by Syuichi Hanatani et al including Toshiteru Shibuya, the present applicant, for assignment to the present assignee. The referenced application was filed as a continuation-in-part application on Dec. 19, 1988 of U.S. patent application Ser. No. 286,021, now issued U.S. Pat. No. 4,984,154 on Jan. 8, 1991. According to the Hanatani et al application, the instruction prefetching device is for successively prefetching each of program instructions as a prefetched instruction before an instruction executing circuit of the data processing system executes a current instruction prefetched earlier than the prefetched instruction.

The instruction prefetching device comprises an instruction memory circuit assigned with real instruction addresses and divided into a plurality of page frames for memorizing the program instructions as memorized instructions. The program instructions generally include branch instructions. The real instruction addresses are held in an instruction address register one at a time as a prefetched real instruction address which belongs to one of the page frames that is used as a prefetch page frame. The real instruction address register accesses the instruction memory circuit to produce one of the memorized instructions from the prefetch real instruction address as the prefetched instruction.

The instruction prefetching device carries out a branch prediction by using a branch history table (BHT). The branch history table memorizes branch address specifying signals which specify real instruction addresses of the branch instructions as branch instruction addresses and branch destination addresses predicted by prior results of execution of the respective branch instructions. When the prefetch real instruction address coincides with a particular one of the branch instruction addresses that is specified by one of the branch address specifying signals, the branch history table produces a BHT (branch history table) hit signal and a particular one of the branch destination addresses that corresponds to the particular branch instruction address as a predicted branch destination address. Responsive to the BHT hit signal, an instruction prefetch control circuit controls a request address selector to make the request address selector supply the instruction address register with the predicted branch destination address which next follows the prefetch real instruction address. Otherwise, the instruction prefetch control circuit controls the request address selector to make the request address selector supply the instruction address register with a next real instruction address which is equal to a sum of the prefetch real instruction address and a read-out width.

As known in the art, program instructions are stored in a virtual storage at successive virtual instruction addresses, namely, successive pages assigned with successive page numbers. However, the program instructions are stored in a real storage (the instruction memory circuit) at discontinuous real instruction addresses, namely, discontinuous page frames assigned with discontinuous page frame numbers. More specifically, the program instructions include page last instructions, each of which is located at an end of a page frame. The page last instruction is followed by a page-over instruction located at a top of another page frame which does not always follow the page frame for the page last instruction in question. In other words, the other page frame for the page-over instruction has a page frame number which is not always equal to that obtained by adding one to another page frame number of the page frame for the page last instruction in question.

That is, a particular page last instruction is indicated by a particular page last real instruction address which belongs to a particular page frame assigned with a particular page frame number. The particular page last instruction is followed by a next succeeding page-over instruction indicated by a specific page-over real instruction address belonging to a specific page frame assigned with a specific page frame number which does not always follow the particular page frame number.

When the prefetch real instruction address coincides with the particular page last instruction without coincidence of the current real instruction address with any branch instruction addresses, the specific page frame number must be calculated in order to prefetch the next succeeding page-over instruction. In other words, prefetch of instruction is not continued when the prefetch real instruction address coincides with one of the page last instructions without coincidence of the prefetch real instruction address with any branch instruction addresses. This is because a change is made as regards a page frame number of a page frame to which a real instruction address of the next following instruction to be prefetched belongs as a result which is obtained by an addition of the prefetch real instruction address and the read-out width. Such a change of the page frame number is called a page-over. On occurrence of the page-over, the prefetch of instruction must be carried out by the real instruction address which belongs to the page frame assigned with the page frame number corresponding to the page number obtained by adding one to the page number in correspondence to the page frame number to which the prefetch real instruction address belongs.

In order to process the page-over, a conventional instruction prefetching device such as that disclosed by Hanatani et al, prefetches the page last instruction as the prefetched instruction from the instruction memory circuit at the page last real instruction address held in the instruction address register. The page last instruction is decoded into a decoded signal by an instruction decoding circuit. Responsive to the decoded signal, an instruction address generating circuit generates a virtual instruction address of the next succeeding page-over instruction which should next be prefetched. The virtual instruction address is translated to a real instruction address of the next succeeding page-over instruction by an instruction address translating circuit. The real instruction address is held in the instruction address register under control of the instruction prefetch control circuit to make the instruction memory circuit produce the next succeeding page-over instruction. Therefore, the conventional instruction prefetching device wastes a lot of time on processing of the page-over. That is, the conventional instruction prefetching device results in degradation of performance of the data processing system.

SUMMARY OF THE INVENTION

It is an object of this invention to provide an instruction prefetching device which is capable of processing of the page-over without useless time.

Other objects of this invention will become clear as the description proceeds.

An instruction prefetching device to which this invention is applicable, is for use in a data processing system including an instruction executing circuit. The instruction prefetching device is for successively prefetching each of program instructions as a prefetched instruction prior to execution by the instruction executing circuit of a current instruction prefetched earlier than the prefetched instruction. The instruction prefetching device comprises an instruction memory circuit assigned with real instruction addresses and divided into a plurality of page frames for memorizing the program instructions as memorized instructions. The program instructions include page last instructions which are located at ends of the respective page frames and page-over instructions which follow the respective page last instructions. The instruction prefetching device furthermore comprises an instruction address register for holding the real instruction addresses one at a time as a prefetch real instruction address which belongs to one of the page frames that is used as a prefetch page frame. The instruction address register accesses the instruction memory circuit to produce one of the memorized instructions from the prefetch real instruction address as the prefetched instruction. According to this invention, the instruction prefetching device comprises history table connected to the instruction address register for memorizing page last address specifying signals which specify the real instruction addresses of the page last instructions as page last real instruction addresses and the real instruction addresses of the page-over instructions as page-over real instruction addresses in correspondence to the respective page last real instruction addresses. The history table produces a table hit signal and a particular page-over real instruction address when the prefetch real instruction address coincides with one of the page last real instruction addresses. The particular page-over real instruction address indicates one of the page-over instructions that next follows one of the page last instructions indicated by the above-mentioned one of the page last real instruction addresses. The instruction prefetching device further comprises address supplying means connected to the history table and the instruction address register for supplying the instruction address register with the particular page-over real instruction address in response to the table hit signal as a next succeeding real instruction address which next follows the prefetch real instruction address to make the instruction memory circuit produce the above-mentioned one of the page-over instructions.

BRIEF DESCRIPTION OF THE DRAWING

FIG. 8 shows another example of instruction words for use in describing operation of the instruction aligning circuit illustrated in FIG. 5;

FIG. 9 is a time chart for use in describing another operation of the instruction aligning circuit illustrated in FIG. 5 in another case given by the other example of instruction words depicted in FIG. 8;

FIG. 10 is a block diagram of a prediction confirming circuit used in the data processing system depicted in FIG. 1;

FIG. 17 is a block diagram of a page-over control circuit used in the data processing system depicted in FIG. 14;

DESCRIPTION OF THE PREFERRED EMBODIMENT

Figure 1:
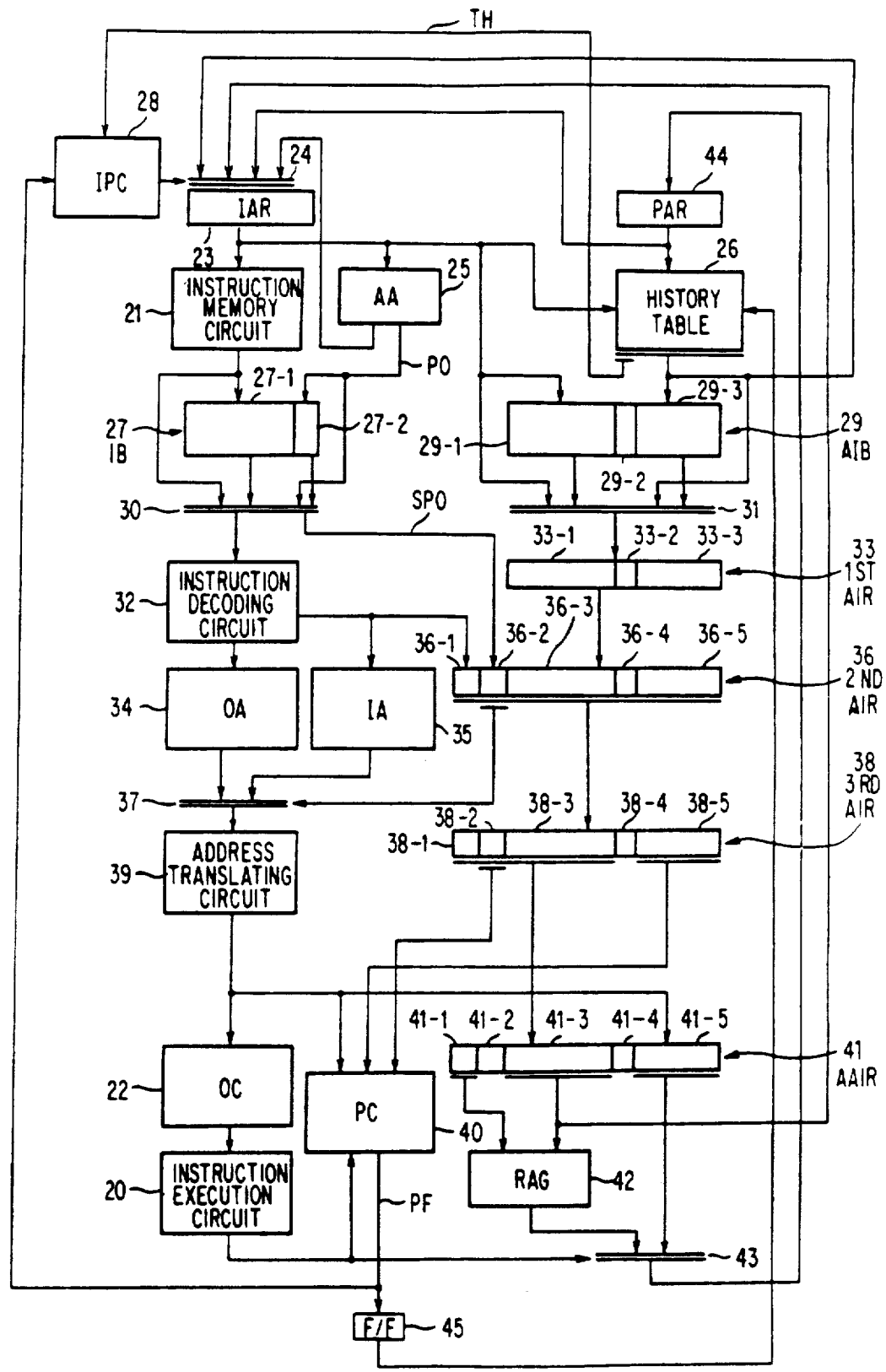
FIG. 1 is a block diagram of a data processing system which includes an instruction prefetching device according to a first embodiment of the present invention.

Referring to FIG. 1, a data or information processing system comprises an instruction prefetching device according to a first embodiment of the present invention.

The data processing system includes an instruction execution circuit (EX) 20. The instruction prefetching device is for successively prefetching each of program instructions as a prefetched instruction prior to execution by the instruction execution circuit 20 of a current instruction prefetched earlier than the prefetched instruction.

The instruction prefetching device comprises an instruction memory circuit (IC) 21. The data processing system includes an operand reading circuit (OC) 22. The operand reading circuit 22 includes an operand memory circuit (not shown). The instruction memory circuit 21 and the operand memory circuit of the operand reading circuit 22 may be parts of a main memory (not shown). The instruction memory circuit 21 and the operand memory circuit may comprise instruction and operand cache memories. Each cache memory is for keeping a copy of a portion of entries which are kept in the main memory. It will be assumed throughout the following that each entry is an eight-byte instruction word or operand. Each instruction word usually consists of a plurality of instructions which may have different instruction lengths.

It will furthermore be assumed that the data processing system is operable under six-stage pipeline control in the manner which will later be described. The six stages of the pipeline control are an address generation stage (AG stage), an address translation stage (AT stage), an operand cache access stage (OC stage), an execution stage (EX stage), an instruction cache access stage (IC stage), and an instruction decoding stage (ID stage). The address generation stage becomes one of an operand address generation stage (OA stage) and an instruction address generation stage (IA stage) at a time.

The instruction memory circuit 21 is assigned with real instruction addresses and divided into a plurality of page frames which are assigned with page frame numbers. The instruction memory circuit 21 is for memorizing the program instructions as memorized instruction words. It will be assumed that each page frame has a page size of 4K (4,096) bytes.

The instruction prefetching device comprises an instruction address register (IAR) 23 in which real instruction addresses are held one at a time as a current prefetch real instruction address through a request address selector 24 which will later be described in detail. The current prefetch real instruction address belongs to one of the page frames that is used as a current prefetch page frame. The instruction address register 23 accesses the instruction memory circuit 21 to produce one of the memorized instruction words from the current prefetch real instruction address as a current prefetched instruction word.

The current prefetch real instruction address is delivered, besides the instruction memory circuit 21, to an instruction address addition circuit (AA) 25 and a history table (HT) 26. The instruction address addition circuit 25 is for calculating a next real instruction address of a next succeeding instruction word which next follows the prefetched instruction word. The next real instruction address is delivered to the request address selector 24. When the next real instruction address becomes over or beyond the prefetch page frame, the instruction address addition circuit 25 produces a page-over signal PO. That is, the instruction address addition circuit 25 produces the page-over signal PO when the instruction memory circuit 21 produces, as the prefetched instruction word, one of the page last instruction words. At any rate, the instruction address addition circuit 25 serves as a page-over detecting arrangement for detecting a page-over.

Both of the current prefetched instruction word and the current page-over signal are delivered to an instruction buffer (IB) 27. The instruction buffer 27 is divided into a prefetch instruction field 27-1 and a page-over field 27-2. The current prefetched instruction word is temporarily set or stored in the prefetch instruction field 27-1 of the instruction buffer 27 as a queue of prefetched instructions starting at an oldest prefetched instruction word and ending at a latest prefetched instruction word. Similarly, the current page-over signal is temporarily set or stored in the page-over field 27-2 of the instruction buffer 27 as another queue of page-over signals starting at an oldest page-over signal and ending at a latest page-over signal.

The history table 26 serves as not only a branch history table but also a page-over history table as will presently become clear.

Like a branch history table of the conventional prefetching device, such as disclosed by Hanatani et al, the history table 26 memorizes branch address specifying signals which specify the real instruction addresses of branch instructions as branch instruction addresses and branch destination addresses predicted by prior results of execution of the respective branch instructions. The history table 26 further memorizes branch validity bits which indicate either validity or invalidity of the branch address specifying signals. The branch address specifying signals, the branch destination addresses, and the branch validity bits are collectively called branch information. At any rate, the history table 26 acts as the branch history table for memorizing the branch information.

When the prefetch real instruction address coincides with one of the branch instruction addresses that is specified by one of the branch address specifying signals, the history table 26 produces a table hit signal TH. Simultaneously, the history table 26 produces the branch validity bit indicative of the validity of the branch address specifying signal in question and the corresponding branch destination address at a current predicted branch destination address. The table hit signal TH is delivered to an instruction prefetch control circuit (IPC) 28. The branch validity bit and the predicted branch destination address are sent to an address information buffer (AIB) 29.

As the page-over history table, the history table 26 furthermore memorizes page last address specifying signals which specify the real instruction addresses of page last instruction words as page last real instruction addresses and the real instruction addresses of page-over instructions which follow the respective page last instructions as page-over real instruction addresses in correspondence to the respective page last real instruction addresses. The history table 26 further memorizes page-over validity bits which indicates either validity or invalidity of the page last address specifying signals. The page last address specifying signals, the page-over real instruction addresses, and the page-over validity bits are collectively called page-over information. At any rate, the history table 26 furthermore acts as the page-over history table for memorizing the page-over information.

Even when the current prefetch real instruction address coincides with one of the page last real instruction addresses that is specified by one of the page last address specifying signals, the history table 26 produces the table hit signal TH. Simultaneously, the history table 26 produces a current page-over validity bit indicative of the validity of the page last address specifying signal in question and the corresponding page-over real instruction address as a current predicted page-over real instruction address. The current page-over validity bit and the current predicted page-over real instruction address are delivered also to the address information buffer 29.

On production of the table hit signal TH, either the current predicted branch destination address or the current predicted page-over real instruction address is sent to the request address selector 24 as a current predicted real instruction address. The history table 26 may be one described in the above-mentioned U.S. patent application Ser. No. 552,223.

Figure 2:
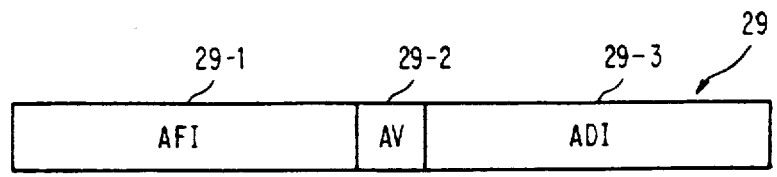
FIGS. 2(a), and (b) together are views for use in describing an address information buffer, first and second address information registers included in the data processing system illustrated in FIG. 1.
Figure 2:
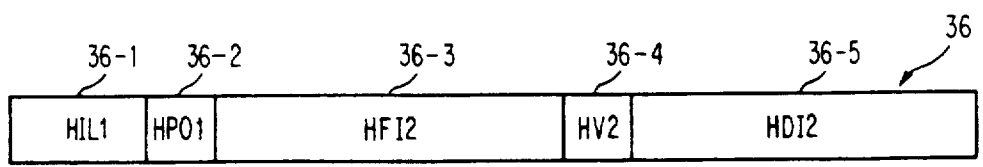

Turning to FIG. 2(a), the address information buffer 29 is divided into a prefetch address field 29-1, a validity flag field 29-2, and a predicted address field 29-3 which are depicted also in FIG. 1. Concurrently with accumulation of successive prefetched instruction words in the instruction buffer 27 in response to successive prefetch real instruction addresses, the branch instruction addresses and the page last real instruction addresses included in the successive prefetch real instruction addresses are accumulated in the prefetch address field 29-1 of the address information buffer 29 collectively as accumulated prefetch instruction addresses AFI (FIG. 2(a)) starting at an oldest prefetch instruction address and ending at a latest prefetch instruction address. The corresponding branch validity bits and the corresponding page-over validity bits delivered from the history table 26 are accumulated in the validity flag field 29-2 of the address information buffer 29 collectively as accumulated validity bits AV starting at an oldest validity bit and ending at a latest validity bit. The corresponding predicted branch destination addresses and the corresponding predicted page-over real instruction addresses are accumulated in the predicted address field 29-3 of the address information buffer 29 collectively as accumulated prediction instruction addresses ADI starting at an oldest predicted instruction address and ending at a latest predicted instruction address.

The instruction buffer 27 is connected to an instruction aligning circuit 30 while the address information buffer 29 is connected to an address information switch 31.

The instruction aligning circuit 30 is supplied with the current prefetched instruction word produced by the instruction memory circuit 21, the oldest prefetched instruction word stored in the instruction buffer 27, the current page-over signal produced by the instruction address addition circuit 25, and the oldest page-over signal stored in the instruction buffer 27. The instruction aligning circuit 30 is for selecting, as a selected instruction word, one of the current prefetched instruction word produced by the instruction memory circuit 21 and the oldest prefetched instruction word stored in the instruction buffer 27. Only when the instruction buffer 27 is empty, the instruction aligning circuit 30 selects the current prefetched instruction word as the selected instruction word. Otherwise, the instruction aligning circuit 30 selects the oldest prefetched instruction word as the selected instruction word. The instruction aligning circuit 30 is furthermore for selecting, as a selected page-over signal SPO, one of the current page-over signal produced by the instruction address addition circuit 25 and the oldest page-over signal stored in the instruction buffer 27. Similarly, the instruction aligning circuit 30 selects the current page-over signal as the selected page-over signal SPO, only when the instruction buffer 27 is empty. Otherwise, the instruction aligner 30 selects the oldest page-over signal as the selected page-over signal SPO. The instruction aligning circuit 30 extracts an instruction from the selected instruction words as a current instruction. The current instruction is delivered to an instruction decoding circuit (ID) 32.

The address information switch 31 is supplied with the current prefetch instruction address produced by the instruction address register 24, the oldest prefetch instruction address accumulated in the prefetch address field 29-1 of the address information buffer 29, the current validity bit and the current predicted instruction address which are produced by the history table 26, and the oldest validity bit and the oldest predicted instruction address which are accumulated in the validity flag field 29-2 and the predicted address field 29-3 of the address information buffer 29, respectively. The address information switch 31 is for selecting, as a selected prefetch instruction address, one of the current prefetch instruction address and the oldest prefetch instruction address. Only when the address information buffer 29 is empty, the address information switch 31 selects the current prefetch instruction address as the selected prefetch instruction address. Otherwise, the address information switch 31 selects the oldest prefetch instruction address as the selected prefetch instruction address. The selected prefetch instruction address is delivered to a first address information register 33. The address information switch 31 is also for selecting, as a selected validity bit, one of the current validity bit and the oldest validity bit. The address information switch 31 selects the current validity bit as the selected validity bit only when the address information buffer 29 is empty. Otherwise, the address information switch 31 selects the oldest validity bit as the selected validity bit. The selected validity bit is sent also to the first address information register 33. The address information switch 31 is for furthermore selecting, as a selected prediction instruction address, one of the current predicted instruction address and the oldest predicted instruction address. Only when the address information buffer 29 is empty, the address information switch 31 selects the current predicted instruction address as the selected prediction instruction address. Otherwise, the address information switch 31 selects the oldest predicted instruction address as the selected prediction instruction address. The selected prediction instruction address is delivered to the first address information register 33.

The instruction decoding circuit 32 is for decoding the current instruction sent from the instruction aligning circuit 30 into a decoded signal. The decoded signal includes an instruction length signal indicative of the instruction length of the current instruction and operand address information used to generate a virtual or logical operand address. The operand address information is delivered to an operand address generating circuit (OA) 34. The instruction length signal is sent to an instruction address generating circuit (IA) 35 and a second address information register (2nd AIR) 36.

The first address information register 33 is divided into a first prefetch address area 33-1, a first validity flag area 33-2, and a first predicted address area 33-3. At the instruction decoding stage, the selected prefetch instruction address, the selected validity bit, and the selected prediction instruction address produced by the address information switch 31 are held in the first prefetch address area 33-1, the first validity flag area 33-2, and the first predicted address area 33-3 of the first address information register 33 as a first held prefetch instruction address HFI1, a first held validity bit HV1, and a first held prediction instruction address HDI1, respectively. The first held prefetch instruction address HFI1, the first held validity bit HV1, and the first held prediction instruction address HDI1 are sent to the second address information register 36.

The operand address generating circuit 34 is for generating the virtual operand address in response to the operand address information produced by the instruction decoding circuit 32. The virtual operand address is delivered to a virtual address selecting circuit 37. The instruction address generating circuit 35 is for generating a virtual or logical instruction address in response to the instruction length signal sent from the instruction decoding circuit 32. The virtual instruction address is sent also to the virtual address selecting circuit 37.

Turning to FIG. 2(b), the second address information register 36 is divided into a first instruction length area 36-1, a first page-over area 36-2, a second prefetch address area 36-3, a second validity flag area 36-4, and a second predicted address area 36-5. At the address generation stage, the instruction length signal produced by the instruction decoding circuit 32 is held in the first instruction length area 36-1 of the second address information register 36 as a first held instruction length signal HIL1. Simultaneously, the selected page-over signal SPO produced by the instruction aligning circuit 31 is held in the first page-over area 36-2 of the second address information register 36 as a first held page-over signal HPO1. The first held prefetch instruction address HFI1, the first held validity bit HV1, and the first held prediction instruction address HDI1 previously held in the first address information register 33 are held in the second prefetch address area 36-3, the second validity flag area 36-4, and the second predicted address area 36-5 of the second address information register 36 as a second held prefetch instruction address HFI2, a second held validity bit HV2, and a second held prediction instruction address HDI2, respectively. The first held instruction length signal HIL1, the first held page-over signal HPO1, the second held prefetch instruction address HFI2, the second held validity bit HV2, and the second held prediction instruction address HDI2, are sent to a third address information register (3rd AIR) 38. In addition, the first held page-over signal HPO1 is delivered to the virtual address selecting circuit 37.

Responsive to the first held page-over signal HPO1, the virtual address selecting circuit 37 selects, as a selected virtual address, one of the virtual operand address generated from the operand address generating circuit 34 and the virtual instruction address generated from the instruction address generating circuit 35. The virtual address selecting circuit 37 selects the virtual instruction address as the selected virtual address when the first held page-over signal HPO1 is present or takes a logic "1" level. When the first held page-over signal HPO1 is absent or takes a logic "0" level, the virtual address selecting circuit 37 selects the virtual operand address as the selected virtual address. The selected virtual address is sent to an address translating circuit (AT) 39.

The address translating circuit 39 is for translating the selected virtual address into an actual real or physical address. The actual real address is sent to the operand reading circuit 22, a prediction confirming circuit (PC) 40, and an actual address information register (AAIR) 41.

The third address information register 38 is divided into a second instruction length area 38-1, a second page-over area 38-2, a third prefetch address area 38-3, a third validity flag area 38-4, and a third predicted address area 38-5 like the second address information register 36. At the address translation stage, the first held instruction length signal HIL1, the first held page-over signal HPO1, the second held prefetch instruction address HFI2, the second held validity bit HV2, and the second held prediction instruction address HDI2 previously held in the second address information register 36 are held in the second instruction length area 38-1, the second page-over area 38-2, the third prefetch address area 38-3, the third validity flag area 38-4, and the third predicted address area 38-5 of the third address information register 38 as a second held instruction length signal HIL2, a second held page-over signal HPO2, a third held prefetch instruction address HFI3, a third held validity bit HV3, and a third held prediction instruction address HDI3, respectively. The second held instruction length signal HIL2, the second held page-over signal HPO2, the third held prefetch instruction address HFI3 are sent to the actual address information register 41. The second held page-over signal HPO2, the third held validity bit HV3, and the third held prediction instruction address HDI3 are delivered to the prediction confirming circuit 40.

The actual address information register 41 is divided into an actual instruction length area 41-1, an actual page-over area 41-2, an actual prefetch address area 41-3, an actual validity flag area 41-4, and an actual predicted address area 41-5 like the second and the third address information registers 36 and 38. The second held instruction length signal HIL2, the second held page-over signal HPO2, and the third held prefetch instruction address HFI3 previously held in the third address information register 38 are held in the actual instruction length area 41-1, the actual page-over area 41-2, the actual prefetch address area 41-3 as an actual instruction length signal AIL, an actual page-over signal APO, and an actual prefetch instruction address AFI, respectively. On the other hand, the actual real address produced by the address translating circuit 39 is held in the actual predicted address area 41-5 as an actual predicted address. The actual instruction length signal AIL and the actual prefetch instruction address AFI are sent to a real address generating circuit (RAG) 42, the actual predicted address is delivered to a real address selecting circuit 43. In addition, the actual prefetch instruction address AFI is sent to the request address selector 24. In the actual address information register 41, both of the actual page-over area 41-2 and the actual validity flag area 41-4 are not used.

The real address generating circuit 42 is for adding the actual instruction length signal AIL to the actual prefetch instruction address AFI to produce an added address as a next real instruction address for an instruction which follows the current instruction. The next real instruction address is delivered to the real address selecting circuit 43.

Responsive to the actual real address for operand that is produced by the address translating circuit 39, the operand reading circuit 22 reads out the operand from the operand memory circuit to supply the instruction execution circuit 20 with the operand.

Supplied with the operand, the instruction execution circuit 20 executes the current instruction by using the operand to produce a result of execution. When the current instruction is a branch instruction, the instruction execution circuit 20 produces an actual branch direction signal indicative of either "branch" or "does not branch" as the result of execution. The actual branch direction signal takes a logic "1" level when the actual branch direction signal indicates "branch". Otherwise, the actual branch direction signal takes a logic "0" level. The actual branch direction signal is delivered to the prediction confirming circuit 40 and the real address selecting circuit 43. If the current instruction is not any branch instruction, the instruction execution circuit 20 produces the actual branch direction signal indicative of "branch".

Responsive to the actual branch direction signal, the real address selecting circuit 43 is for selecting, as a selected real instruction address, one of the next real instruction address produced by the real address generating circuit 42 and the actual predicted address produced by the actual address information register 41. When the actual branch direction signal indicates "branch", the real address selecting circuit 43 produces the actual predicted address as the selected real instruction address. Otherwise, the real address selecting circuit 43 produces the next real instruction address as the selected real instruction address. The selected real instruction address is sent to a prediction address register (PAR) 44.

The prediction address register 44 holds the selected real instruction address as a prediction real instruction address. The prediction real instruction address is delivered to the history table 26 and the request address selector 24.

Responsive to the actual branch direction signal, the second held page-over signal HPO2, and the third held validity bit HV3, the prediction confirming circuit 40 confirms whether or not the third held prediction instruction address HDI3 produced by the third address information register 38 coincides with the actual real address produced by the address translating circuit 39. When the third held prediction instruction address HDI3 does not coincide with the actual real address, the prediction confirming circuit 40 produces a prediction failure signal PF indicative of a failure of prediction. The prediction failure signal takes a logic "1" level when the prediction failure signal indicates the failure of prediction. Otherwise, the prediction failure signal takes a logic "0" level. The prediction failure signal PF is sent to the instruction prefetch control circuit 28 and a write pulse flip-flop 45.

Responsive to the prediction failure signal, the write pulse flip-flop 45 supplies the history table 26 with a write pulse.

Responsive to the prediction failure signal and the table hit signal, the instruction prefetch control circuit 28 controls the request address selector 24 to make the request address selector 24 supply the instruction address register 23 with, as a new current prefetch real instruction address, one of the current predicted instruction address produced by the history table 26, the actual prefetch instruction address AFI produced by the actual address information register 41, the prediction real instruction address produced by the prediction address register 44, and the next real instruction address produced by the instruction address addition circuit 25. At any rate, a combination of the instruction prefetch control circuit 28 and the request address selector 24 acts as an address supplying arrangement for supplying the instruction address register 23 with the current prefetch real instruction address.

Responsive to the write pulse produced by the write pulse flip-flop 45, the history table 26 stores an address specifying signal specifying the current prefetched instruction address produced by the request address register 23, a validity bit indicative of the validity, and the prediction real instruction address produced by the prediction address register 44, as one of the address specifying signals, one of the validity bits, and one of the predicted instruction addresses. At any rate, the write pulse flip-flop 45 serves in cooperation with the prediction address register 44 as a renewing arrangement for renewing the predicted instruction address addressed by the current prefetched instruction address to the prediction real instruction address as a new predicted instruction address.

Figure 3:
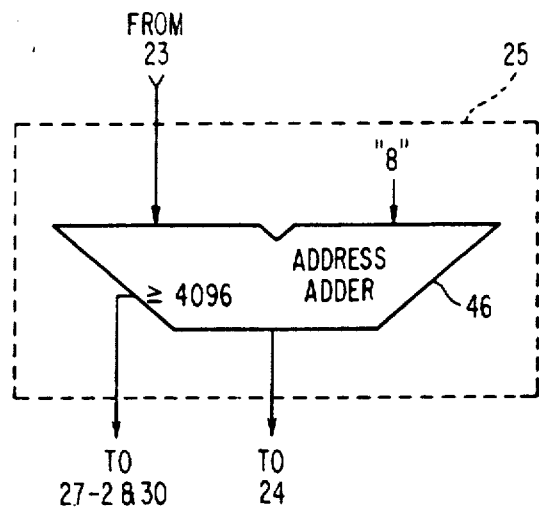
FIG. 3 is a block diagram of an instruction address addition circuit used in the data processing system depicted in FIG. 1.

Turning to FIG. 3, the instruction address addition circuit 25 comprises an address adder 46 for adding the current prefetch real instruction address held in the instruction address register 23 to a read-out width of decimal eight "8" to produce, as the next real instruction address, a result of addition from which three lower bits are omitted. The next real instruction address is therefore produced as a multiple of decimal eight. The address adder 46 furthermore produces the page-over signal PO when the result of addition is equal to or more than decimal 4,096, namely, a carry occurs out of twelve lower bits at a thirteenth bit as counted from a least significant bit.

Figure 4:
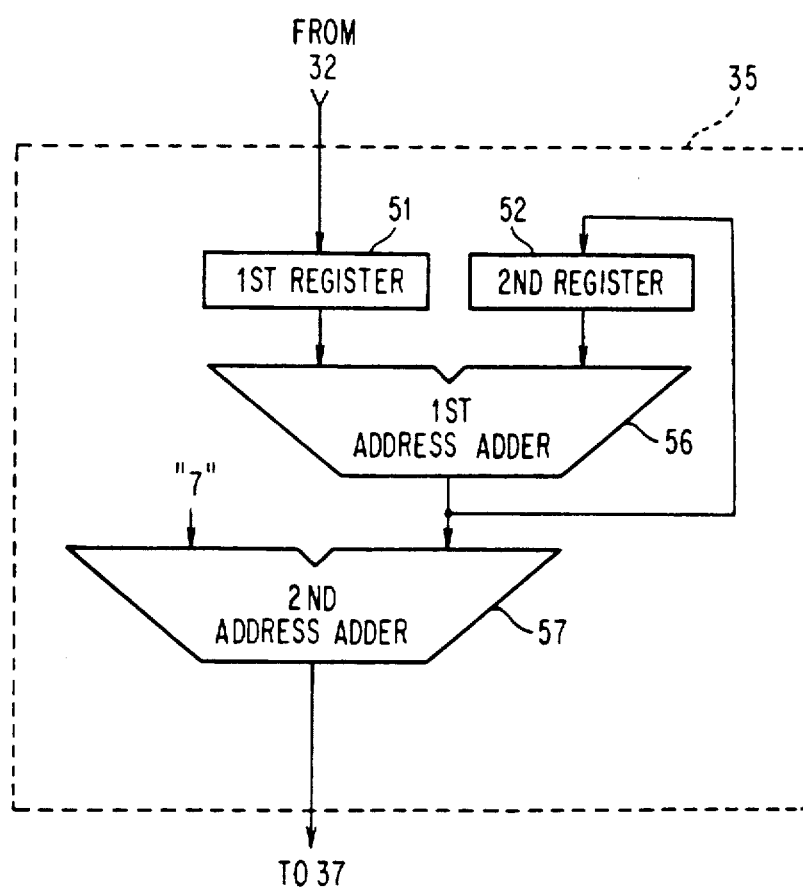
FIG. 4 is a block diagram of an instruction address generating circuit used in the data processing system depicted in FIG. 1.

Turning to FIG. 4, it will be assumed that each instruction length indicated by the instruction length signal is one of two bytes, four bytes, six bytes, and eight bytes long. The instruction address generating circuit 35 comprises first and second registers 51 and 52. Supplied with the instruction length signal produced by the instruction decoding circuit 32, the first register 51 holds the instruction length signal as a held instruction length signal. The held instruction length signal is delivered to a first address adder 56. The second register 52 holds a virtual instruction address of the current instruction as a held virtual address. The held virtual address is sent to the first address adder 56. Supplied with the held instruction length signal and the held virtual address, the first address adder 56 adds the held virtual address to the held instruction length signal to produce, as a next virtual instruction address, a virtual instruction address of an instruction which next follows the current instruction. The next virtual instruction address is turned back to the second register 52 and delivered to a second address adder 57. The second address adder 57 is for adding the next virtual instruction address to decimal seven to produce, as the virtual instruction address, a result of addition from which three lower bits are omitted.

When a page last virtual instruction address is held in the second register 52 as the held virtual address, the second address adder 57 produces the virtual instruction address belonging to a next page which next follows a current prefetch page in correspondence to the current prefetch page frame in which the current instruction belongs. More specifically, the page last virtual instruction address is identical with one of virtual instruction addresses which are not less than decimal (4096p-8) and less than 4096p, where p represents a natural number. Under the circumstances, the second address adder 57 produces decimal 4096p as the virtual instruction address.

Figure 5:
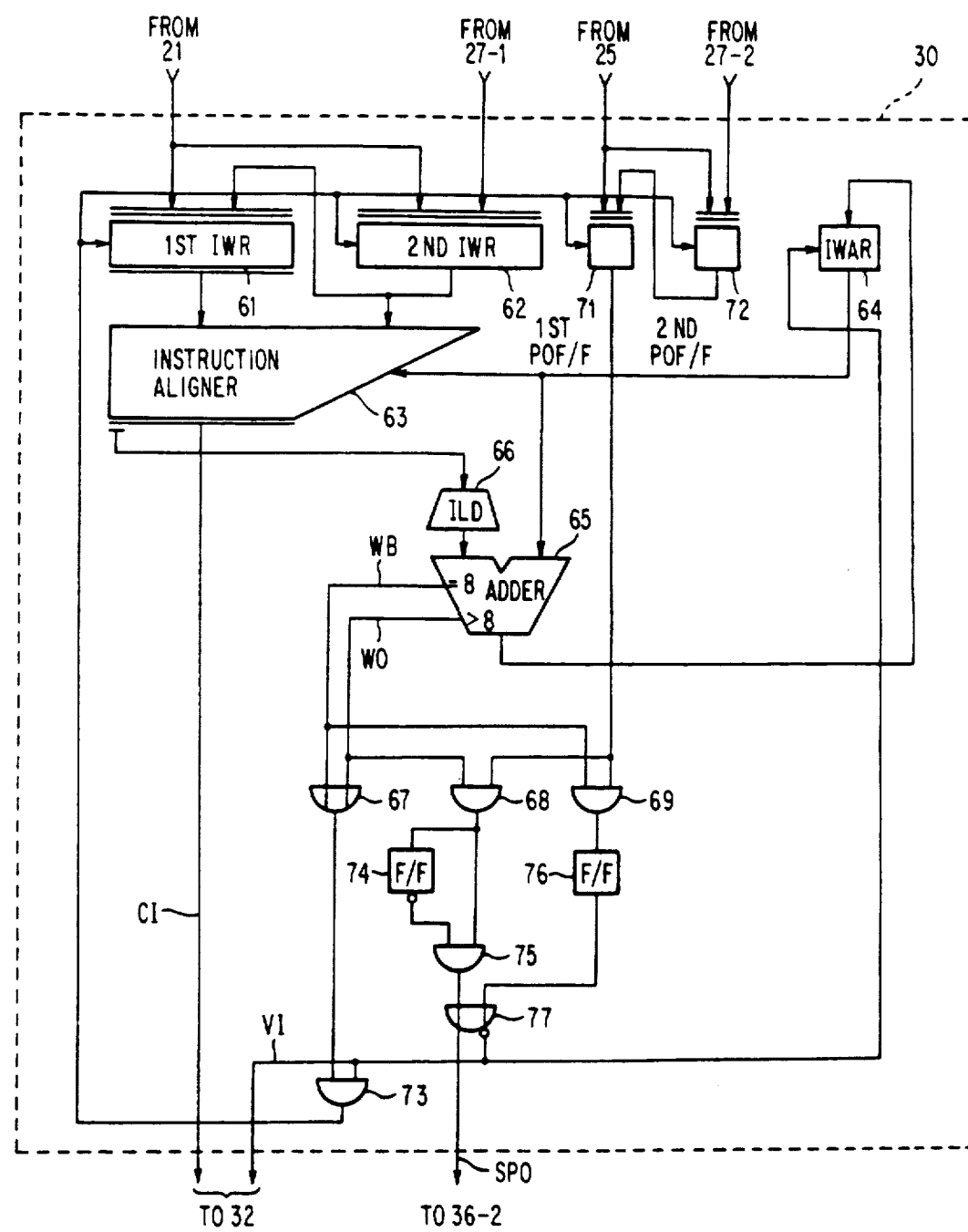
FIG. 5 is a block diagram of an instruction aligning circuit used in the data processing system depicted in FIG. 1.

Referring to FIG. 5, the instruction aligning circuit 30 comprises first and second instruction word registers (1st IWR and 2nd IWR) 61 and 62. The first instruction word register 61 holds a first held instruction word which will presently be described. The second instruction word register 62 holds, as a second held instruction word, one of the current prefetched instruction word produced by the instruction memory circuit 21 and the oldest prefetched instruction word stored in the prefetch instruction field 27-1 of the instruction buffer 27. Only when the instruction buffer 27 is empty, the second instruction word register 62 holds the current prefetched instruction word as the second held instruction word. Otherwise, the second instruction word register 62 holds the oldest prefetched instruction word as the second held instruction word. The first held instruction word is one of the current prefetched instruction word produced by the instruction memory circuit 21 and the second held instruction word held in the second instruction word register 62. Only when the instruction buffer 27 is empty, the first instruction word register 61 holds the current prefetched instruction word as the first held instruction word. Otherwise, the first instruction word register 61 holds the second held instruction word as the first held instruction word. Both of the first held instruction word and the second held instruction word are delivered to an instruction aligner 63.

The instruction aligning circuit 30 comprises an intra-word or in-word address register (IWAR) 64 for holding an intra-word address of the current instruction to be aligned as a held intra-word address. The held intra-word address is sent to the instruction aligner 63 and an adder 65. Responsive to the held intra-word address, the instruction aligner 63 extracts the current instruction from the first and the second held instruction words. A part of the current instruction is delivered to an instruction length decoder (ILD) 66 as a current instruction part. The instruction length decoder 66 decodes the current instruction part to produce a current instruction length signal indicative of an instruction length of the current instruction. The instruction length signal is delivered to the adder 65. Supplied with the instruction length signal and the held intra-word address, the adder 65 adds the instruction length signal to the held intra-word address to produce a next intra-word address of a next instruction which next follows the current instruction. The next intra-word address is equal to three lower bits of a result of addition obtained by the adder 65. The next intra-word address is fed back to the intra-word address register 64. When the result of addition is equal to decimal eight, the adder 65 produces a word boundary signal WB. When the result of addition is greater than decimal eight, the adder 65 produces a word-over signal WO. The word-over signal WO is sent to a first OR gate 67 and a first AND gate 68. The word boundary signal WB is delivered to the first OR gate 67 and a second AND gate 69.

The instruction aligning circuit 30 further comprises first and second page-over flip-flops (1st POF/F and 2nd POF/F) 71 and 72 which correspond to the first and the second instruction word registers 61 and 62, respectively. The first page-over flip-flop 72 sets a first set page-over signal which will shortly be described. The second page-over flip-flop 72 sets, as a second set page-over signal, one of the current page-over signal produced by the instruction address addition circuit 25 and the oldest page-over signal stored in the page-over field 27-2 of the instruction buffer 27. Only when the instruction buffer 27 is empty, the second page-over flip-flop 72 sets the current page-over signal as the second set page-over signal. Otherwise, the second page-over flip-flop 72 sets the oldest page-over signal as the second set page-over signal. The first set page-over signal is one of the current page-over signal produced by the instruction address addition circuit 25 and the second set page-over signal set in the second page-over flip-flop 72. Only when the instruction buffer 27 is empty, the first page-over flip-flop 71 sets the current page-over signal as the first set page-over signal. Otherwise, the first page-over flip-flop 71 sets the second set page-over signal as the first set page-over signal. The first set page-over signal is delivered to the first and the second AND gates 68 and 69.

The first OR gate 67 calculates an OR of the word-over signal WO and the word boundary signal WB which are supplied from the adder 65 to produce a first OR'ed signal. The first OR'ed signal is delivered to a third AND gate 73. The first AND gate 68 calculates an AND of the word-over signal WO and the first set page-over signal to produce a first AND'ed signal. The first AND'ed signal is delivered to a first flip-flop 74 and a fourth AND gate 75. The second AND gate 69 calculates and AND of the word boundary signal WB and the first set page-over signal to produce a second AND'ed signal. The third AND gate 73 produces a third AND'ed signal which will presently be described. The second AND'ed signal is sent to a second flip-flop 76. The first flip-flop 74 is supplied with the first AND'ed signal to produce an inverted first set signal which is inverted from a first set signal. The inverted first set signal is delivered to the fourth AND gate 75. The fourth AND gate 75 calculates an AND of the inverted first set signal and the first AND'ed signal to produce a fourth AND'ed signal. The fourth AND'ed signal is sent to a second OR gate 77. The second flip-flop 76 is supplied with the second AND'ed signal to produce a second set signal. The second set signal is delivered to the second OR gate 77. The second OR gate 77 calculates an OR of the fourth AND'ed signal and the second set signal to produce a second OR'ed signal and an inverted second OR'ed signal. The second OR'ed signal is delivered as the selected page-over signal SPO to the first page-over area 33-1 of the first address information register 33 (FIG. 1). The inverted second OR'ed signal is delivered to the third AND gate 73 and the intra-word address register 64. Responsive to the inverted second OR'ed signal, the intra-word address register 64 holds the next intra-word address produced by the adder 65 as a new held intra-word address. The inverted second OR'ed signal is also delivered to the instruction decoding circuit 32 (FIG. 1) as a valid indication signal depicted at VI and indicative of a validity of the current instruction. The third AND'ed signal is obtained by an AND of the first OR'ed signal and the inverted second OR'ed signal. The third AND'ed signal is sent to the first and the second instruction word registers 61 and 62 and the first and the second page-over flip-flops 71 and 72. Responsive to the third AND'ed signal, each of the first and the second instruction word registers 61 and 62 and the first and the second page-over flip-flops 71 and 72 carries out a holding operation.

In practice, the instruction aligning circuit 30 includes a control circuit (not shown) for controlling a branch prediction. Illustration of the control circuit is omitted from the instruction aligning circuit 30 in FIG. 5 because the control circuit has no connection with the present invention.

Operation of the instruction aligning circuit 30 will be described with reference to FIGS. 6, 7, 8, and 9.

Figure 6:
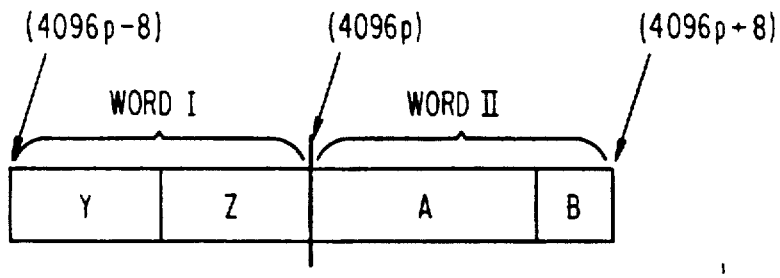
FIG. 6 shows an example of instruction words for use in describing operation of the instruction aligning circuit illustrated in FIG. 5.
Figure 7:
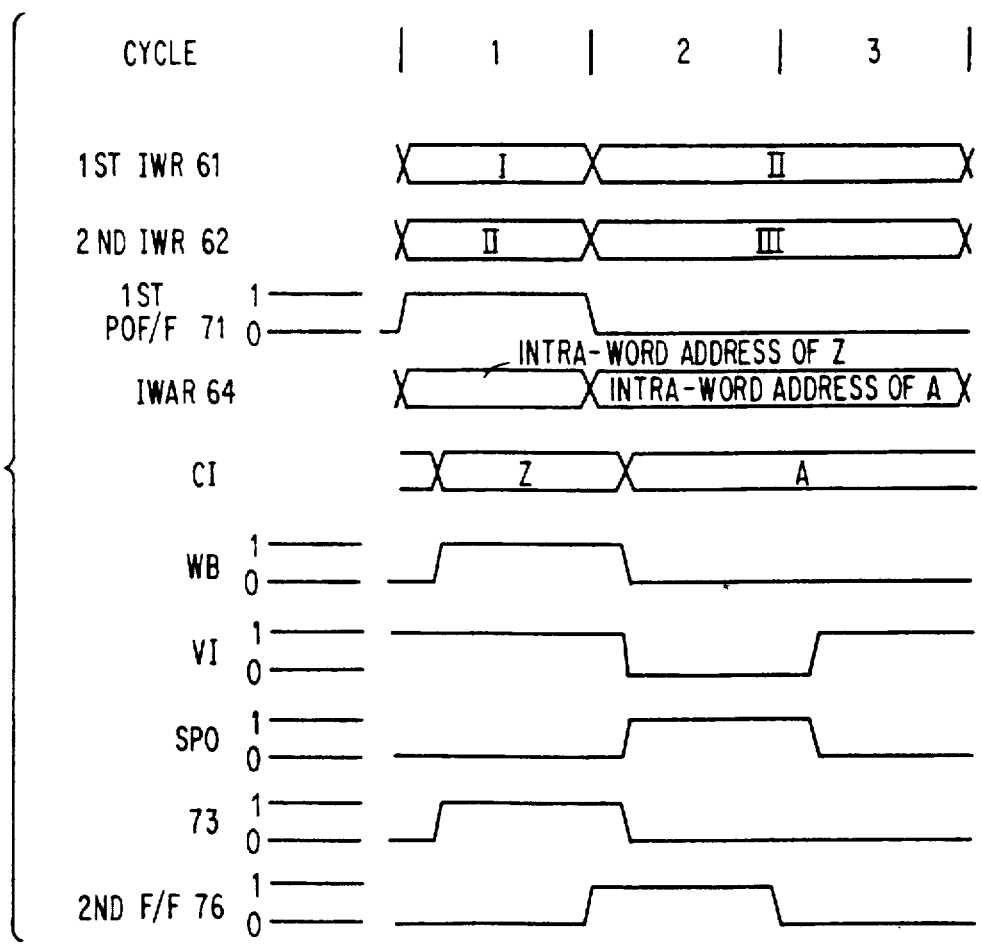
FIG. 7 is a time chart for use in describing operation of the instruction aligning circuit illustrated in FIG. 5 in a case given by the example of instruction words depicted in FIG. 6.

Referring to FIGS. 6 and 7 in addition to FIG. 5, description will at first be made as regards operation of the instruction aligning circuit 30 in a first case where the first instruction word register 61 holds a page last instruction word I belonging to a page frame and where the second instruction word register 62 holds a page-over instruction word II which next follows the page last instruction word I and belongs to another page frame different from the page frame for the page last instruction word I with no instruction interposed between the first and the second instruction word registers 61 and 62 at a time. In the first case, the page last instruction word I comprises an instruction Y of four bytes and a page last instruction Z which next follows the instruction Y and is four bytes long. The page-over instruction word II comprises a page-over instruction A which next follows the page last instruction Z and is six bytes long, and an instruction B which next follows the instruction A and is two bytes long. In FIG. 6, a heavy solid line indicates a page boundary. The page-over instruction word II is followed by an instruction word III. First through third machine cycles are indicated along a first or top line in FIG. 7 by numerals 1 through 3.

In the first machine cycle, the page last instruction word I and the page-over instruction word II are set in the first and the second instruction word registers (IWR) 61 and 62 in the manner depicted along second and third lines from the top. Simultaneously, the page-over signal of the logic "1" level is set in the first page-over flip-flop (POF/F) 71 in the manner depicted along a fourth line from the top. Furthermore, the page-over signal of the logic "0" level is set in the second page-over flip-flop 72. The intra-word address register (IWAR) 64 holds the intra-word address of the page last instruction Z which should be extracted and aligned in the manner depicted along a fifth line from the top.

Responsive to the intra-word address of the instruction Z, the page last instruction Z is extracted by the instruction aligner 63 as the current instruction CI in the manner depicted along a sixth line from the top. At the same time, the instruction length decoder 66 decodes the page last instruction Z to produce the instruction length signal indicative of the instruction length of the page last instruction Z. The adder 65 adds the instruction length signal to the intra-word address to produce the next intra-word address of the page-over instruction A. Inasmuch as the result of addition obtained by the adder 65 is equal to decimal eight, the adder 65 produces the word boundary signal WB in the manner depicted along a seventh line from the top. As a result, the second AND gate 69 produces the second AND'ed signal of the logic "1" level. In addition, the first OR gate 67 produces the first OR'ed signal of the logic "1" level. The second OR gate 77 produces the inverted second OR'ed signal of the logic "1" level as the valid indication signal VI and the second OR'ed signal of the logic "0" level as the selected page-over signal SPO in the manner depicted along eighth and ninth lines from the top. The third AND gate 73 produces the third AND'ed signal of the logic "1" level in the manner depicted along a tenth line from the top.

In the second machine cycle, the page-over instruction word II is set in the first instruction word register 61 and the page-over signal of the logic "0" level is set in the first page-over flip-flop 71. This is because the third AND gate 73 produces the third AND'ed signal of the logic "1" level at the first machine cycle. At the same time, the intra-word address register 64 is loaded with the next intra-word address of the page-over instruction A, namely, "0". This is because the second OR gate 77 produces the inverted second OR'ed signal of the logic "1" level at the first machine cycle. Inasmuch as the second AND gate 69 produces the second AND'ed signal of the logic "1" level, the logic "1" level is set in the second flip-flop 76 in the manner depicted along an eleventh line from the top. The page-over instruction A is aligned by the intra-word address register 64 and the instruction aligner 61. A next intra-word address of the next instruction B is calculated by the instruction length decoder 66 and the adder 65. Inasmuch as the second flip-flop 76 produces the second set signal of the logic "1" level, the second OR gate 77 turns the selected page-over signal SPO to the logic "1" level and produces the valid indication signal VI of the logic "0" level. In addition, the third AND gate 73 produces the third AND'ed signal of the logic "0" level.

In the third machine cycle, the first and the second instruction word registers 61 and 62 and the first and the second page-over flip-flops 71 and 72 continuously hold the contents which are held at the second machine cycle. This is because the third AND gate 73 produces the third AND'ed signal of the logic "0" level at the second machine cycle. In addition, the intra-word address register 64 continuously holds the content which is held at the second machine cycle. This is because the second OR gate 77 produces the inverted second OR'ed signal of the logic "0" level at the second machine cycle. As a result, the page-over instruction A is aligned and produced as the current instruction CI once more like in the second machine cycle. The logic "0" level is set in the second flip-flop 76. Therefore, the second OR gate 77 switches the selected page-over signal SPO back to the logic "0" level and the valid indication signal VI of the logic "1" level. Accordingly, the page-over instruction A is supplied to the instruction decoding circuit 32 (FIG. 1) as the current instruction CI accompanying with the valid indication signal VI indicative of the validity of the current instruction CI.

Referring to FIGS. 8 and 9 in addition to FIG. 5, description will be made as regards operation of the instruction aligning circuit 30 in a second case where the first instruction word register 61 holds a page last instruction word I belonging to a page frame and where the second instruction word register 62 holds a page-over instruction word II which next follows the page last instruction word I and belongs to another page frame different from the page frame for the page last instruction word I with a page-over instruction A interposed between the first and the second instruction word registers 61 and 62 at a time. In the second case, the page last instruction word I comprises a page last instruction Z of six bytes and a part of the page-over instruction A which next follows the instruction Z and is four bytes long. That is, the page last instruction word I includes only that part of the page-over instruction A which is two bytes long. The page-over instruction word II comprises another part of the page-over instruction A that is two bytes long and an instruction B which next follows the page-over instruction A and is six bytes long. In FIG. 8, a heavy dot-dash line indicates a page boundary. The page-over instruction word II is followed by an instruction word III. First through third machine cycles are indicated along a first or top line in FIG. 9 by numerals 1 through 3.

In the first machine cycle, the page last instruction word I and the page-over instruction word II are set in the first and the second instruction word registers 61 and 62 in the manner depicted along second and third lines from the top. Simultaneously, the page-over signal of the logic "1" level is set in the first page-over flip-flop 71 in the manner depicted along a fourth line from the top. In addition, the page-over signal of the logic "1" level is set in the second page-over flip-flop 72. The intra-word address register 64 holds the intra-word address of the page-over instruction A which is interposed between the first and the second instruction word registers 61 and 62 in the manner depicted along a fifth line from the top.

Responsive to the intra-word address of the page-over instruction A, the page-over instruction A is extracted by the instruction aligner 63 as the current instruction CI in the manner depicted along a sixth line from the top. At the same time, the instruction length decoder 66 decodes the page last instruction Z to produce the instruction length signal indicative of the instruction length of the page-over instruction A. The adder 65 adds the instruction length signal to the intra-word address to produce the next intra-word address of the next instruction B. Inasmuch as the result of addition obtained by the adder 65 is greater than decimal eight, the adder 65 produces the word-over signal WO in the manner depicted along a seventh line from the top. As a result, the first OR gate 67 produces the first OR'ed signal of the logic "1" level and the first AND gate 68 produces the first AND'ed signal of the logic "1" level in the manner depicted along an eighth line from the top. Inasmuch as the logic "0" level is set in the first flip-flop 74 in the manner depicted along a ninth line from the top, namely, the first flip-flop 74 produces the inverted first set signal of the logic "1" level in the manner depicted along a tenth line from the top, the fourth AND gate 75 produces the fourth AND'ed signal of the logic "1" level in the manner depicted along an eleventh line from the top. Therefore, the second OR gate 77 produces the inverted second OR'ed signal of the logic "0" level as the valid indication signal VI and the second OR'ed signal of the logic "1" level as the selected page-over signal SPO in the manner depicted along twelfth and thirteenth lines from the top. Accordingly, the third AND gate 73 produces the third AND'ed signal of the logic "0" level in the manner depicted along a fourteenth line from the top.

In the second machine cycle, the first and the second instruction word registers 61 and 62 and the first and the second page-over flip-flops 71 and 72 continuously hold the contents which are held at the first machine cycle. This is because the third AND gate 73 produces the third AND'ed signal of the logic "0" level at the first machine cycle. In addition, the intra-word address register 64 continuously holds the content which is held at the first machine cycle. This is because the second OR gate 77 produces the inverted second OR'ed signal of the logic "0" level at the first machine cycle. As a result, the page-over instruction A is aligned and produced as the current instruction CI once more like in the second machine cycle. The adder 65 calculates the intra-word address of the next instruction B which next follows the page-over instruction A and produces the word-over signal WO. Like in the first machine cycle, the first OR gate 67 produces the first OR'ed signal of the logic "1" level and the first AND gate 68 produces the first AND'ed signal of the logic "1" level. Inasmuch as the first AND'ed signal of the logic "1" level is set in the first flip-flop 74, namely, the first flip-flop 74 produces the inverted first set signal of the logic "0" level, the fourth AND gate 75 produces the fourth AND'ed signal of the logic "0" level. As a result, the second OR gate 77 produces the inverted second OR'ed signal of the logic "1" level as the valid indication signal VI and the second OR'ed signal of the logic "0" level as the selected page-over signal SPO. Accordingly, the third AND gate 73 produces the third AND'ed signal of the logic "1" level. Therefore, the instruction A is supplied to the instruction decoding circuit 32 (FIG. 1) as the current instruction CI accompanying the valid indication signal VI indicative of the validity of the current instruction CI.

In the third machine cycle, the first and the second instruction word registers 61 and 62 hold the page-over instruction word II and the instruction word III. The first and the second page-over flip-flops 71 holds the page-over signal of the logic "0" level. The intra-word address of the instruction B is held in the intra-word address register 64. Responsive to the intra-word address of the instruction B, the instruction aligner 63 extracts the instruction B from the page-over instruction word II and supplies the instruction decoding circuit 32 (FIG. 1) with the instruction B.

As is apparent from the above, the instruction aligning circuit 30 is supplied with the page last instruction word I and supplies the instruction decoding circuit 32 with the page last instruction Z which is included in the page last instruction word I. The instruction aligning circuit 30 produces the selected page-over signal SPO without supply of the page-over instruction A during one machine cycle. Thereafter, the instruction aligning circuit 30 supplies the instruction decoding circuit 32 with the page-over instruction A.

Turning to FIG. 10, the prediction confirming circuit 40 comprises an address comparator 80 which is supplied with the actual real address produced by the address translation circuit 39 (FIG. 1) and the third held prediction instruction address HDI3 produced by the third predicted address area 38-5 of the third address information register 38 (FIG. 1). The address comparator 80 compares the actual real address with the third held prediction instruction address HDI3. The address comparator 80 produces a noncoincidence signal of a logic "1" level when the actual real address does not coincide with the third held prediction instruction address HDI3. The noncoincidence signal is delivered to a fifth AND gate 81 which is supplied with the third held validity bit HV3 from the third validity flag area 38-4 of the third address information register 38 (FIG. 1). The fifth AND gate 81 calculates an AND of the noncoincidence signal and the third held validity bit HV3 to produce a fifth AND'ed signal.

The prediction confirming circuit 40 furthermore comprises third, fourth, and fifth flip-flops 83, 84, and 85. Supplied with the second held page-over signal HPO2 from the second page-over area 38-2 of the third address information register 38 (FIG. 1), the third flip-flop 83 holds the second held page-over signal HPO2 as a final held page-over signal. The third flip-flop 83 is therefore referred to alternatively as a final page-over flip-flop. The final held page-over signal is delivered to a third OR gate 86. Supplied with the fifth AND'ed signal from the fifth AND gate 81, the fourth flip-flop 84 holds the fifth AND'ed signal as a held noncoincidence signal. The fourth flip-flop 84 is therefore referred to alternatively as a noncoincidence flip-flop. The held noncoincidence signal is sent to a sixth AND gate 87. Supplied with the third held validity bit HV3 from the third validity flag area 38-4 of the third address information register 38 (FIG. 1), the fifth flip-flop 85 holds the third held validity bit HV3 as a final held validity bit. The fifth flip-flop 85 is therefore referred to alternatively as a final validity bit flip-flop. The final held validity bit is delivered to an Exclusive OR gate 88.

Supplied with the final held page-over signal and with the actual branch direction signal from the instruction execution circuit 20, the third OR gate 86 calculates an OR of the actual branch direction signal and the final held page-over signal to produce a third OR'ed signal. The third OR'ed signal is delivered to the sixth AND gate 87 supplied with the held noncoincidence signal and to the Exclusive OR gate 88 supplied with the final held validity bit. The sixth AND gate 87 calculates an AND of the third OR'ed signal and the held noncoincidence signal to produce a sixth AND'ed signal. The sixth AND'ed signal is delivered to a fourth OR gate 89. The Exclusive OR gate 88 calculates an Exclusive OR of the third OR'ed signal and the final held validity bit to produce an exclusive-OR'ed signal. The exclusive-OR'ed signal is delivered also to the fourth OR gate 89. Supplied with the sixth AND'ed signal and the exclusive-OR'ed signal, the fourth OR gate 89 calculates an OR of the sixth AND'ed signal and the exclusive-OR'ed signal to produce a fourth OR'ed signal as the prediction failure signal.

A combination of the third OR gate 86 and the sixth AND gate 87 is for detecting noncoincidence between the actual real address supplied from the address translation circuit 39 and the third held prediction instruction address HDI3 fed from the third predicted address area 38-5 of the third address information register 38 even though prediction is carried out as regards either the last page instruction or the branch instruction. The Exclusive OR gate 88 is for detecting a case where the prediction is carried out although the current instruction is neither the last page instruction nor the branch instruction and another case where the prediction is not carried out although the current instruction is either the last page instruction or the branch instruction.

Figure 11:
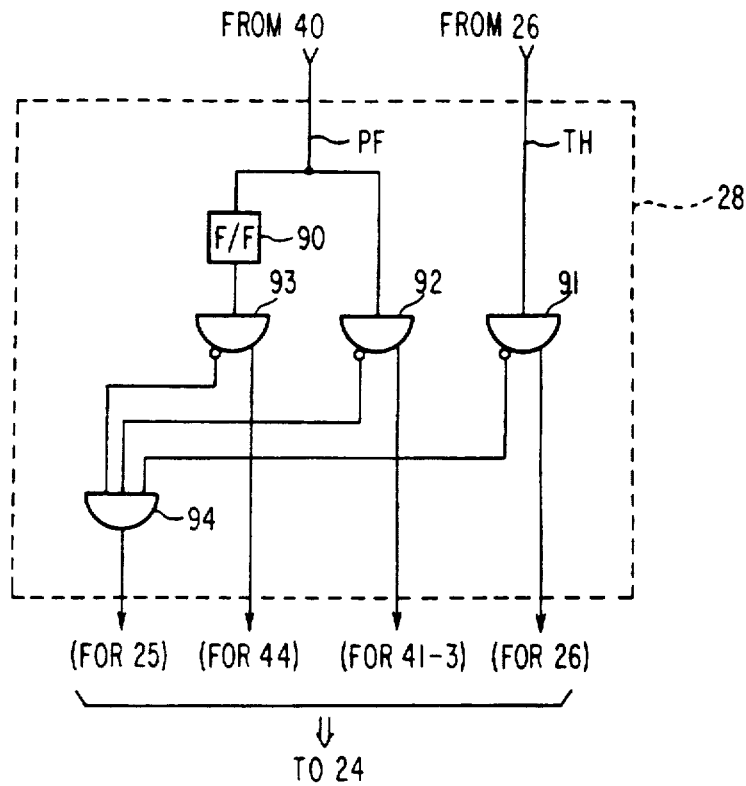
FIG. 11 is a block diagram of an instruction prefetch control circuit used in the data processing system depicted in FIG. 1.

Turning to FIG. 11, the instruction prefetch control circuit 28 comprises a sixth flip-flop 90, first, second, and third buffer gates 91, 92, and 93, each of which has an inverting output terminal and a noninverting output terminal, and a seventh AND gate 94. Supplied with the prediction failure signal from the prediction confirming circuit 40 (FIG. 1), the sixth flip-flop 90 holds the prediction failure signal as a held prediction failure signal during one machine cycle. The held prediction failure signal is delivered to the third buffer gate 93.

Responsive to the table hit signal supplied from the history table 26 (FIG. 1), the first buffer gate 91 produces a first noninverted output signal and a first inverted output signal from its noninverting and inverting output terminals, respectively. The first noninverted output signal is supplied to the request address selector 24 as a first selection indication signal indicative of selection of the current predicted instruction address supplied from the history table 26. The first inverted output signal is sent to the seventh AND gate 94. Responsive to the prediction failure signal supplied from the prediction confirming circuit 40, the second buffer gate 92 produces a second noninverted output signal and a second inverted output signal from its noninverting and inverting output terminals, respectively. The second noninverted output signal is supplied to the request address selector 24 as a second selection indication signal indicative of selection of the actual prefetch instruction address AFI supplied from the actual prefetch address area 41-3 of the actual address information register 41 (FIG. 1). When selected by the request address selector 24, the actual prefetch instruction address AFI is either the page last instruction address or the branch instruction address and is used as a renewing address for renewal of the history table 26. The second inverted output signal is sent to the seventh AND gate 94. Responsive to the held prediction failure signal supplied from the sixth flip-flop 90, the third buffer gate 93 produces a third noninverted output signal and a third inverted output signal from its noninverting and inverting output terminals, respectively. The third noninverted output signal is supplied to the request address selector 24 as a third selection indication signal indicative of selection of the prediction real instruction address supplied from the prediction address register 44 (FIG. 1). When selected by the request address selector 24, the prediction real instruction address is either the page-over instruction address or the branch destination address. The third inverted output signal is sent to the seventh AND gate 94. Supplied with the first through the third inverted output signals, the seventh AND gate 94 calculates an AND of the first through the third inverted output signals to produce a seventh AND'ed signal as a fourth selection indication signal indicative of selection of the next real instruction address supplied from the instruction address addition circuit 25 (FIG. 1). That is, the next real instruction address is selected by the request address selector 24 when any of the table hit signal, the prediction failure signal, and the held prediction failure signal does not occur.

Figure 12:
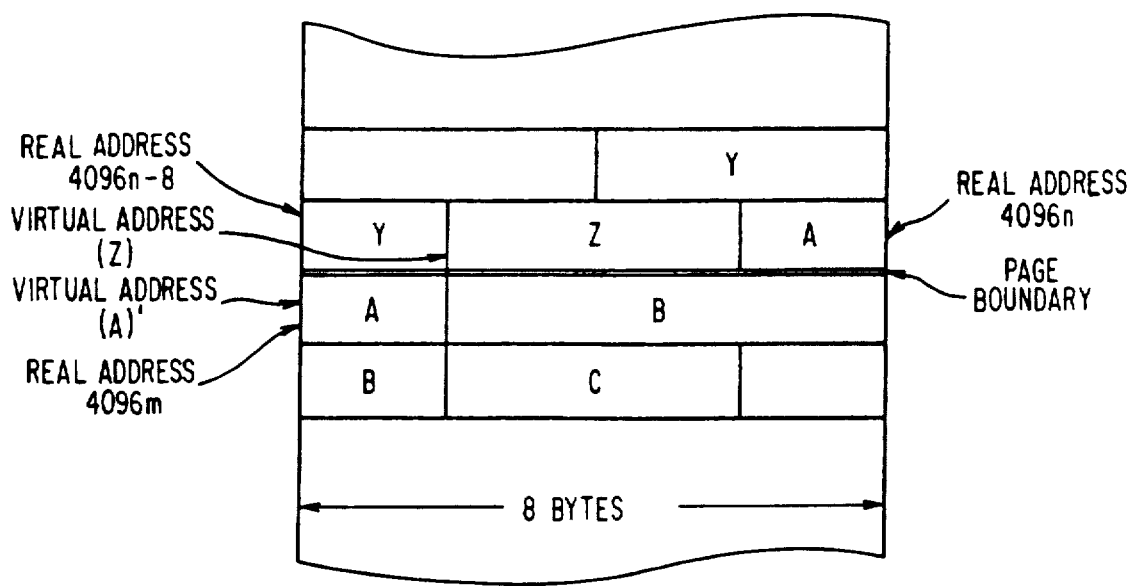
FIG. 12 shows an array of instructions for use in describing operation of the data processing system depicted in FIG. 1.

Referring to FIG. 12, attention will be directed to an array of instructions which are depicted at Y, Z, A, B, C, and so on in a virtual address space. The instruction A extends across the page boundary. Therefore, the instruction A is the page-over instruction. The page-over instruction A follows the page last instruction Z and is followed by the instruction B. More particularly, the page-over instruction A is divided at the page boundary into a front portion and a rear portion which follows the front portion. The front portion of the page-over instruction A is included in a page last instruction word addressed by a page last real instruction address of decimal "4096n-8" where n represents a first positive integer. The rear portion of the page-over instruction A is included in a page-over instruction word addressed by a page-over real instruction address of decimal "4096m" where m represents a second positive integer different from the first positive integer. It will be assumed that the page-over real instruction address of decimal "4096m" corresponds to a page-over virtual address depicted at <A>' and the instruction Z is addressed by a virtual address depicted at <Z>.

Figure 13A:
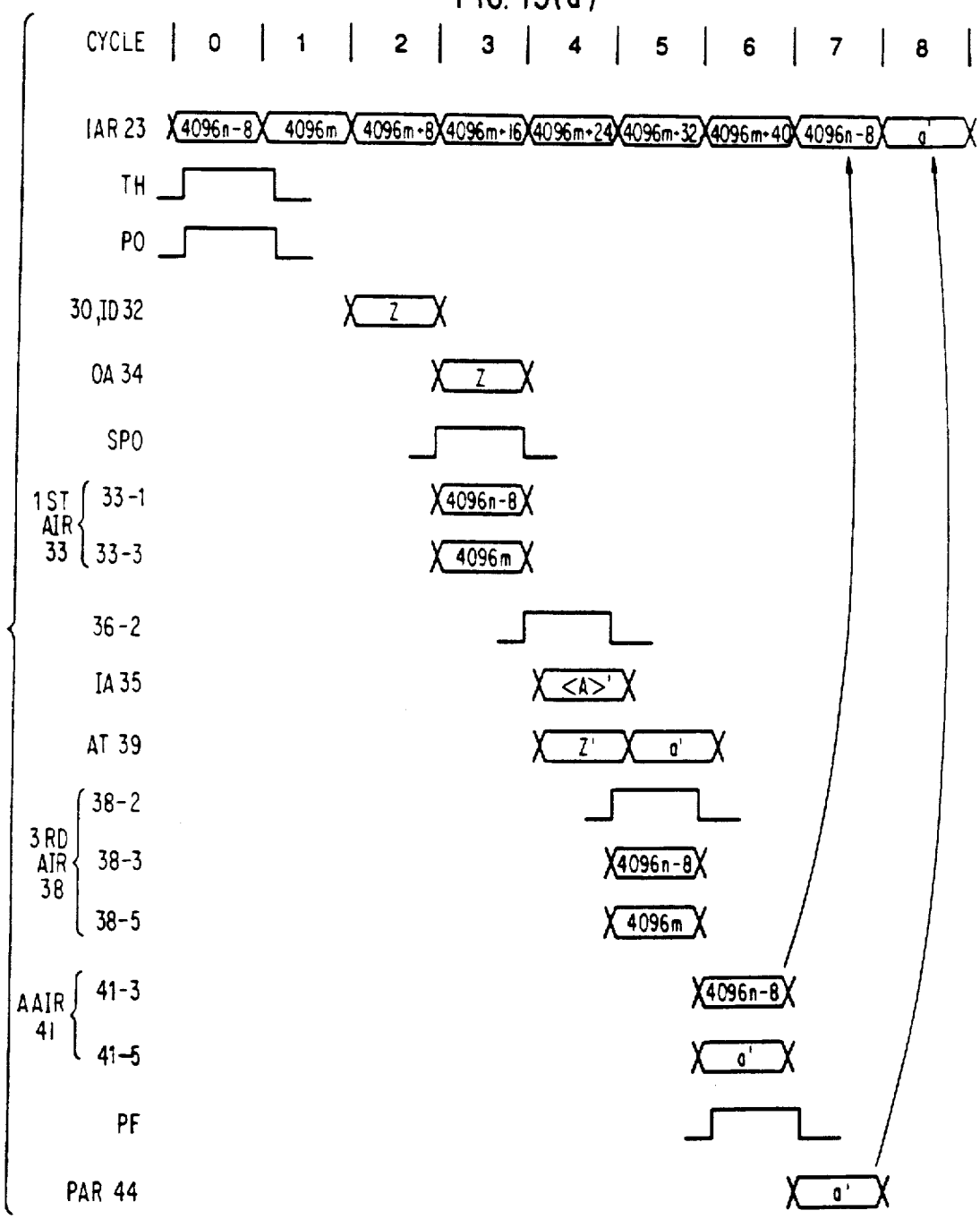
FIGS. 13(a) and (b) collectively show a time chart for use in describing operation of the data processing system depicted in FIG. 1.
Figure 13B:
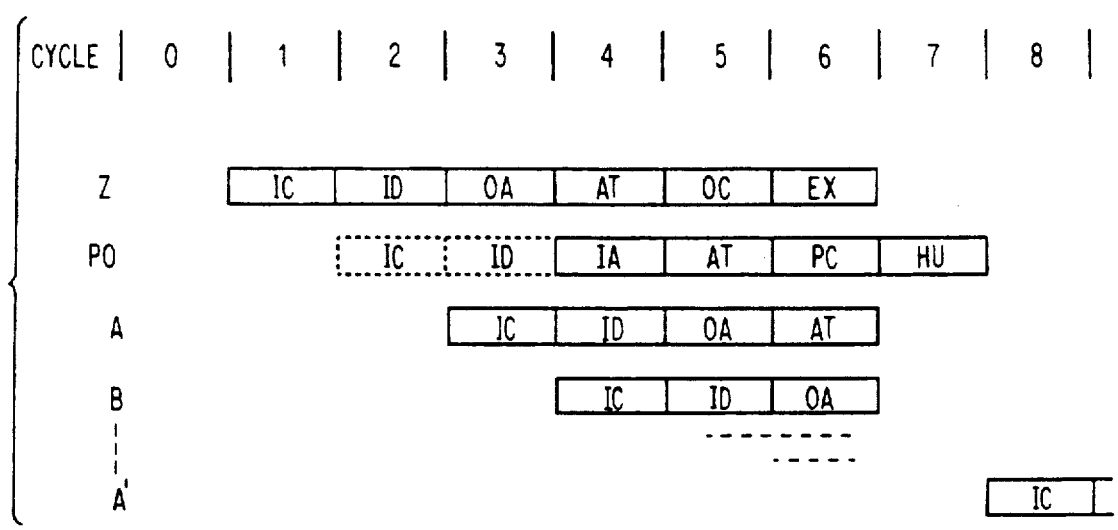

Referring to FIGS. 13(a) and (b) in addition to FIG. 1, description will be made as regards operation of the data processing system including the instruction prefetching device according to the present invention in a case where execution is made as regards the array of instructions illustrated in FIG. 12. Zeroth through eighth machine cycles are indicated along a first or top line in each of FIGS. 13(a) and (b) by numerals 0 through 8. FIG. 13(a) is a time chart for use in describing operation of the data processing system illustrated in FIG. 1. FIG. 13(b) is another time chart for use in describing a flow of the array of instructions illustrated in FIG. 12.

In the zeroth machine cycle, the page last real instruction address "4096n-8" is set in the instruction address register 23 in the manner depicted along a second line from the top in FIG. 13(a). The history table 26 is addressed by the page last real instruction address to produce the current predicted page-over real instruction address "4096m", the current page-over validity bit, and the table hit signal TH in the manner depicted along a third line from the top in FIG. 13(a). Simultaneously, the instruction address addition circuit 25 adds the page last real instruction address "4096n-8" to the read-out width "8" to produce the page-over signal PO in the manner depicted along a fourth line from the top in FIG. 13(a).

In the first machine cycle, the predicted page-over real instruction address "4096m" is set in the instruction address register 23. At the same time, the last page instruction Z is supplied to the instruction aligning circuit 30 from the instruction memory circuit 21 through the instruction buffer 27 in the manner depicted along a second line from the top in FIG. 13(b).

In the second machine cycle, an aligning and decoding operation of the last page instruction Z is carried out by the instruction aligning circuit 30 and the instruction decoding circuit 32 in the manner depicted along a fifth line from the top in FIG. 13(a) and along the second line in FIG. 13(b).

In the third machine cycle, the operand address generating circuit 34 generates a virtual operand address of the last page instruction Z in the manner depicted along a sixth line from the top in FIG. 13(a) and along the second line in FIG. 13(b). Supply of the page-over instruction A from the instruction aligning circuit 30 to the instruction decoding circuit 32 is suspended. Instead of the supply of the page-over instruction A, the selected page-over signal SPO is supplied to the first page-over area 33-1 of the second address information register 36 in the manner depicted along a seventh line from the top in FIG. 13(a). Simultaneously, the page last real instruction address "4096n-8" and the predicted page-over real instruction address "4096m" are held in the first prefetch address area 33-1 and the first predicted address area 33-3 of the first address information register 33 as the first held prefetch instruction address HFI1 and the first held prediction instruction address HDI1, respectively, in the manner depicted along eighth and ninth lines from the top in FIG. 13(a) and along a third line from the top in FIG. 13(b). The page-over instruction A is supplied to the instruction decoding circuit 32 in the manner depicted along a fourth line from the top in FIG. 13(b).

In the fourth machine cycle, the selected page-over signal SPO is held in the first page-over area 36-2 of the second address information register 36 as the first held page-over signal HPO1 in the manner depicted along a tenth line from the top in FIG. 13(a). In addition, the first held prefetch instruction address HFI1 and the first held prediction instruction address HDI1 are held in the second prefetch address area 36-3 and the second predicted address area 36-5 of the second address information register 33 as the second held prefetch instruction address HFI2 and the second held prediction instruction address HDI2, respectively. The instruction address generating circuit 35 generates the page-over virtual address <A>' in the manner depicted along an eleventh line from the top in FIG. 13(a). The address translating circuit 39 carries out an address translation operation of the virtual operand address of the last page instruction Z into a real operand address Z' in the manner depicted along a twelfth line from the top in FIG. 13(a). The decoding operation of the page-over instruction A is carried out by the instruction decoding circuit 32 in the manner depicted along the fourth line in FIG. 13(b).

In the fifth machine cycle, the operand reading circuit 22 reads an operand out of the bperand memory circuit in response to the real operand address Z' in the manner depicted along the second line in FIG. 13(b). The first held page-over signal HPO1, the second held prefetch instruction address HFI2, and the second held prediction instruction address HDI2 are held in the second page-over area 38-2, the third prefetch address area 38-3, and the third predicted address area 38-5 of the third address information register 38 as the second held page-over signal HPO3, the third held prefetch instruction address HFI3, and the third held prediction instruction address HDI3, respectively, in the manner depicted along thirteenth through fifteenth lines from the top in FIG. 13(a). The page-over virtual address <A>' is translated into an actual page-over real address a' by the address translating circuit 39 in the manner depicted along the twelfth line in FIG. 13(a) and along the second line in FIG. 13(b). The operand address generating circuit 34 generates a virtual operand address of the page-over instruction A in the manner depicted along the fourth line in FIG. 13(b).

In the sixth machine cycle, the instruction execution circuit 20 executes the page last instruction Z by using the operand in the manner depicted along the second line in FIG. 13(b). The third held prefetch instruction address HFI3 and the actual page-over real address a' are held in the actual prefetch address area 41-3 and the actual predicted address area 41-5 of the actual address information register 41 as the actual prefetch instruction address AFI and the actual predicted address, respectively, in the manner depicted along sixteenth and seventeenth lines from the top in FIG. 13(a). Confirmation of prediction (PC) is carried out by the prediction confirming circuit 40 in the manner depicted along the third line in FIG. 13(b). More specifically, the prediction confirming circuit 40 confirms whether or not the third held prediction instruction address HDI3, namely, "4096m" coincides with the actual page-over real address a'. If the third held prediction instruction address "4096m" coincides with the actual page-over real address a', the page-over instruction A and the instructions B, C and so on are successively executed by the instruction execution circuit 20 in the eighth machine cycle and machine cycles following the eighth machine cycle.

Otherwise, the prediction confirming circuit 40 produces the prediction failure signal PF in the manner depicted along an eighteenth line from the top in FIG. 13(a). Under the circumstances, the page-over instruction A and the instructions B, C and so on are cancelled in the next or the seventh machine cycle.

In the seventh machine cycle, the actual predicted address, namely, the actual page-over real address a' is held in the prediction address register 44 in the manner depicted along a nineteenth line from the top in FIG. 13(a). Responsive to the prediction failure signal PF, the instruction prefetch control circuit 28 controls the request address selector 24 to make the request address selector 24 supply the instruction address register 23 with the actual prefetch instruction address AFI, namely, "4096n-8". When the history table 26 is accessed by the actual prefetch instruction address, the write pulse renews the page-over real instruction address "4096m" in the history table 26 to the actual predicted address, namely, the actual page-over real address a' in the manner depicted along the third line in FIG. 13(b).

In the eighth machine cycle, the instruction prefetch control circuit 28 controls the request address selector 24 to make the request address selector 24 supply the instruction address register 23 with the actual predicted address a'.

As is apparent from the above, execution is successively carried out as regards the page last instruction Z, the page-over processing, and the page-over instruction A which is predicted by a prior result of execution of the page-over processing. As a result, cancellation is made as regards the instructions which follow the page-over processing when prediction fault is detected by the prediction confirming circuit 40 during execution of the page-over processing. Therefore, it never occurs that either any necessary instruction is cancelled or instructions to be cancelled are not cancelled. Accordingly, minimum instructions are always cancelled.

It takes a loss time of one machine cycle to execute the page-over processing when the prediction of the page-over comes true. Otherwise, it takes another loss time of six machine cycles to execute the page-over processing. It is experimentally proved that the prediction of the page-over processing has a hit rate of about 0.9. The hit rate indicates probability of hit of the prediction. In order to execute the page-over processing, it takes an average loss time of machine cycles given by:

$$1 \times 0.9 + 6 \times 0.1 = 1.5.$$

In contrast, it takes a loss time of four machine cycles, which corresponds to the IC stage, the ID stage, the IA stage, and the AT stage, to execute the page-over processing in the conventional instruction prefetching device such as that disclosed by Hanatani et al. Therefore, the instruction prefetching device of the first embodiment can execute the page-over processing at the average loss time shorter than that of the conventional instruction prefetching device by two and a half machine cycle.

Figure 14:
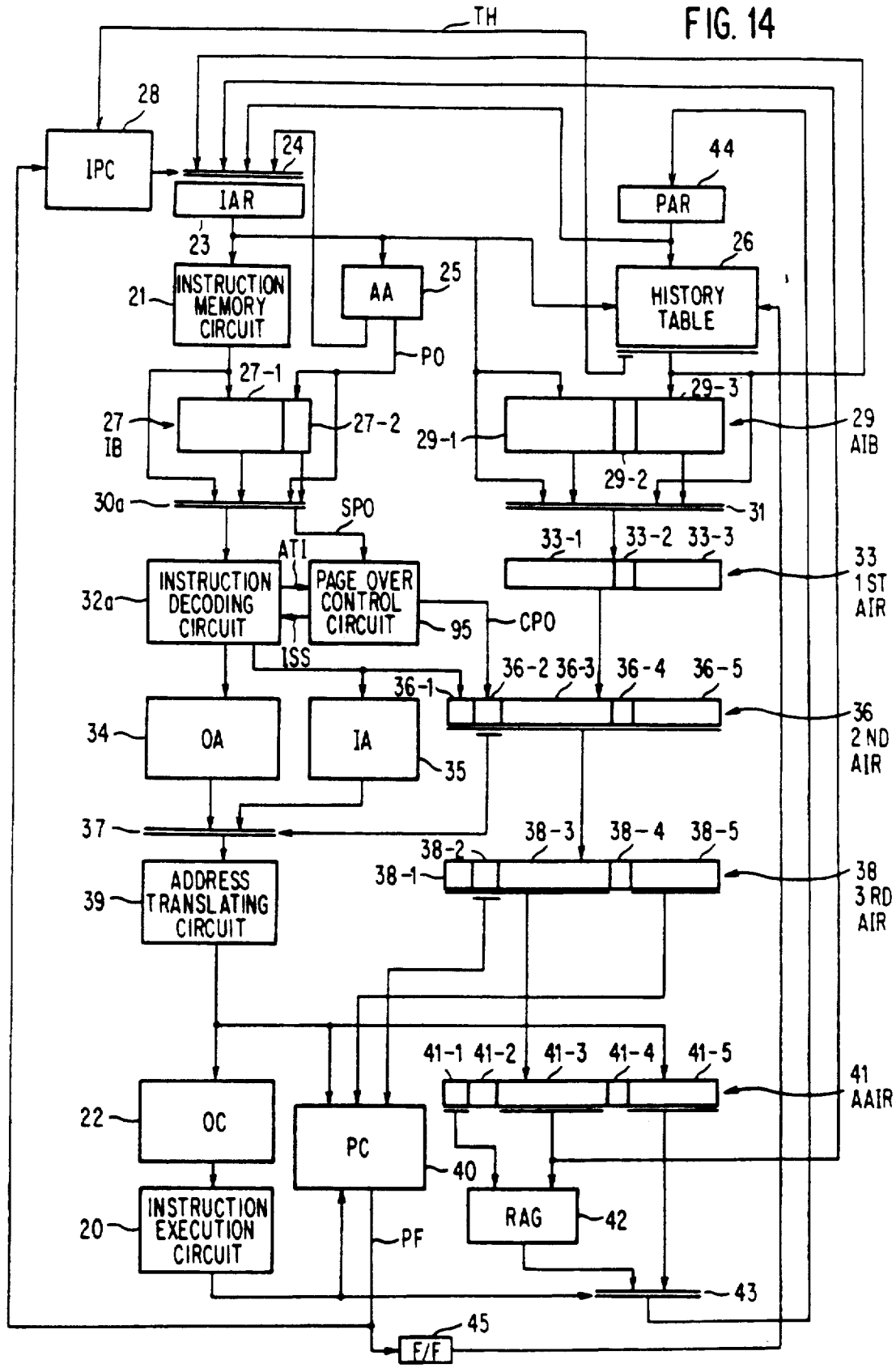
FIG. 14 is a block diagram of a data processing system which includes an instruction prefetching device according to a second embodiment of the present invention.

Referring to FIG. 14, the description will proceed to a data processing system including an instruction prefetching device according to a second embodiment of the present invention. The illustrated data processing system is similar to that illustrated in FIG. 1 except that the instruction aligning circuit and the instruction decoding circuit are modified from those illustrated in FIG. 1 with addition of a page-over control circuit (POC) 95 as will later become clear. The instruction aligning circuit and the instruction decoding circuit are therefore depicted at 30a and 32a. In the illustrated data processing system, similar parts are represented by like reference numerals as in FIG. 1. Description of such parts will be omitted for the purpose of brevity of the description.

Each instruction may or may not be an instruction to which an address translation is necessary. Such an instruction is called an address translation instruction. The address translation is either an address translation for reading out an operand or an address translation for a destination address of a branch instruction. Supplied with a current instruction from the instruction aligning circuit 30a, the instruction decoding circuit 32a produces an address translation instruction signal ATI of a logic "1" level when the current instruction is the address translation instruction. Otherwise, the instruction decoding circuit 32a produces the address translation instruction signal of a logic "0" level. The address translation instruction signal is delivered to the page-over control circuit 95. Responsive to the address translation instruction signal, the page-over control circuit 95 controls the selected page-over signal PRO supplied from the instruction decoding circuit 32a to produce a controlled page-over signal CPO. The controlled page-over signal PCO is delivered to the first page-over area 36-2 of the second address information register 36. The page-over control circuit 95 supplies the instruction decoding circuit 32a with an instruction supply suspension signal ISS.

Figure 15:
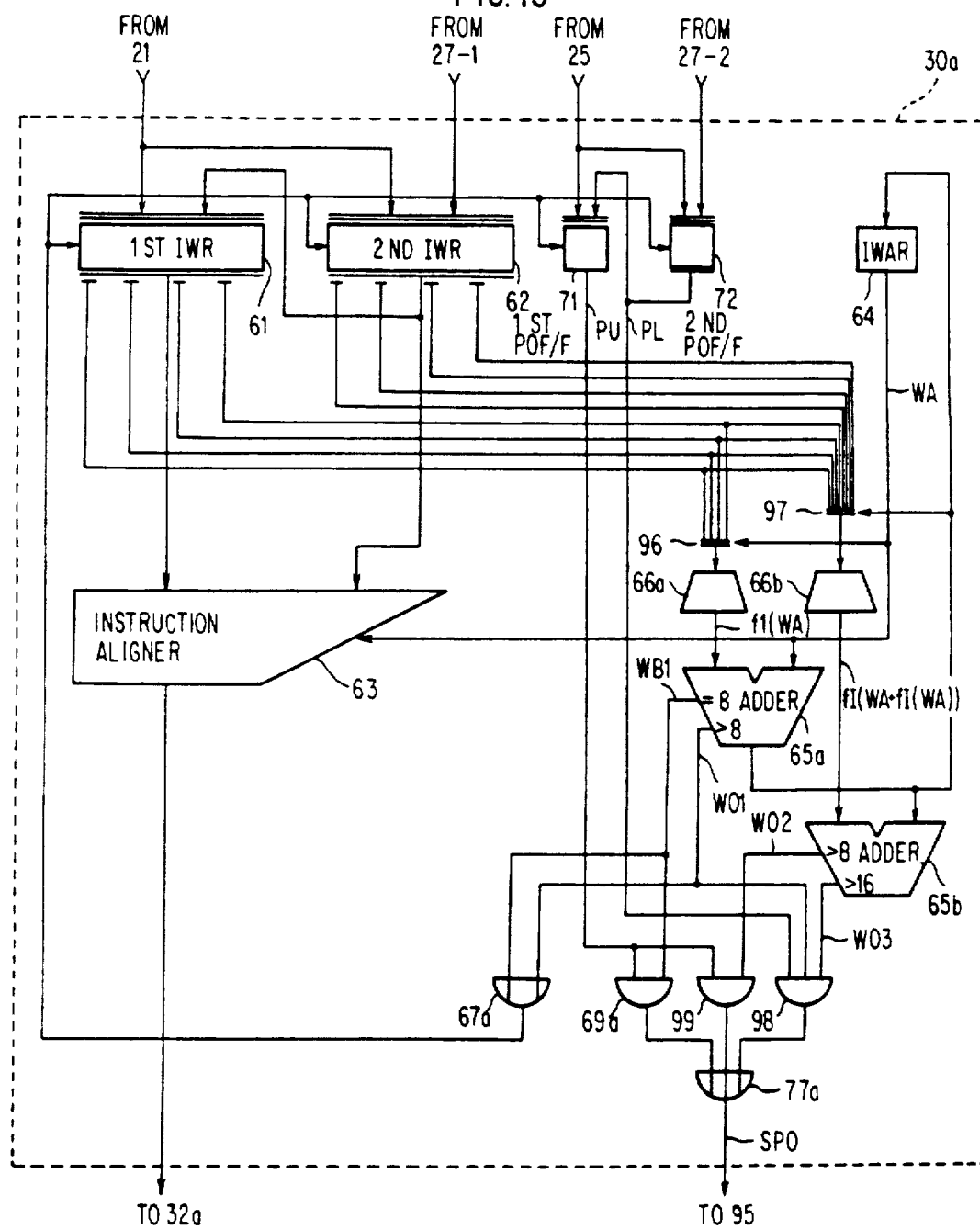
FIG. 15 is a block diagram of an instruction aligning circuit used in the data processing system depicted in FIG. 14.

Turning to FIG. 15, the instruction aligning circuit 30a is modified from the instruction aligning circuit 30 illustrated in FIG. 5 as will later become clear. In the illustrated instruction aligning circuit 30a, similar parts are represented by like reference numerals as in FIG. 5. Description of such parts will be omitted for the purpose of brevity of the description.

Inasmuch as each instruction has an instruction length which is one of two bytes, four bytes, six bytes, and eight bytes long and is therefore accessed by an instruction address having an address number which is equal to an even number, each instruction word of eight bytes includes at least a part of an instruction having a leftmost byte, namely, an operation code of one byte long that is located at one of zeroth byte, second byte, fourth byte, and sixth byte in the instruction word as counted from the leftmost byte of the instruction word under consideration.

The first instruction register 61 is connected to a first operation code aligner 96. Both of the first and the second instruction registers 61 and 62 is connected to a second operation code aligner 97. The first operation code aligner 96 is supplied with zeroth, second, fourth, and sixth bytes of the first held instruction word produced by the first instruction registers 61. The first operation code aligner 96 extracts, as a first extracted operation code, the operation code from the first held instruction word in response to two upper bits of the held intra-word address produced by the intra-word address register 64. The first extracted operation code is identical with the zeroth byte of the current instruction produced by the current aligner 63. The first extracted operation code is delivered to a first instruction length decoder 66a. The second operation code aligner 97 is supplied with zeroth, second, fourth, and sixth bytes of the first and the second held instruction words which are produced by the first and the second instruction registers 61 and 62. The second operation code aligner 97 extracts, as a second extracted operation code, the operation code from the first and the second held instruction words in response to a next intra-word address produced by a first adder 65a. The second extracted operation code is delivered to a second instruction length decoder 66b.

Responsive to the first extracted operation code, the first instruction length decoder 66a decodes the first extracted operation code to produce the current instruction length signal fl(WA) indicative of the instruction length of the current instruction. The current instruction length signal fl(WA) is delivered to the first adder 65a. Supplied with the current instruction length signal fl(WA) and the held intra-word address WA produced by the intra-word address register 64, the first adder 65a adds the current instruction length signal fl(WA) to the held intra-word address WA to produce the next intra-word address which is equal to three bits of a first result of addition {WA+fl(WA)} obtained by the first adder 65a. The next intra-word address is sent to the intra-word address register 64, the second operation code aligner 97, and a second adder 65b. When the first result of addition {WA+fl(WA)} is equal to decimal eight, the first adder 65a produces a first word boundary signal WB1. When the first result of addition {WA+fl(WA)} is greater than decimal eight, the first adder 65a produces a first word-over signal WO1. The first word boundary signal WB1 is delivered to the first OR gate depicted at 67a and the second AND gate depicted at 69a. The first word-over signal WO1 is sent to the first OR gate 67a and an eighth AND gate 98.

Responsive to the second extracted operation code supplied from the second operation code aligner 97, the second instruction length decoder 66a decodes the second extracted operation code to produce a next instruction length signal fl(WA+fl(WA)) indicative of a next instruction length of a next instruction which next follows the current instruction. The next instruction length signal fl(WA+fl(WA)) is delivered to the second adder 65b. Supplied with the next instruction length signal fl(WA+fl(WA)) and the first result of addition {WA+fl(WA)} produced by the first adder 65a, the second adder 65b adds the next instruction length signal fl(WA+fl(WA)) to the first result of addition {WA+fl(WA)} to produce a subsequent intra-word address of an instruction which next follows the next instruction. The subsequent intra-word address is equal to three bits of a second result of addition {WA+fl(WA)+fl(WA+fl(WA))} obtained by the second adder 65b. When the second result of addition {WA+fl(WA)+fl(WA+fl(WA))} is greater than decimal eight, the second adder 65b produces a second word-over signal WO2. The second word-over signal WO2 is sent to a ninth AND gate 99. When the second result of addition {WA+fl(WA)+fl(WA+fl(WA))} is greater than decimal sixteen, the second adder 65b produces a third word-over signal WO3. The third word-over signal WO3 is delivered to the eighth AND gate 98.

Supplied with the first word boundary signal WB1 and the first word-over signal WO1 produced by the first adder 65a, the first OR gate 67a calculates an OR of the first word boundary signal WB1 and the first word-over signal WO1 to produce the first OR'ed signal. The first OR'ed signal is delivered to the first and the second instruction registers 61 and 62 and the first and the second page-over flip-flops 71 and 72 to make the first and the second instruction registers 61 and 62 and the first and the second page-over flip-flops 71 and 72 carry out the holding operation. Supplied with the first word boundary signal WB1 produced by the first adder 65a and the first set page-over signal which is produced by the first page-over flip-flop 71 and is depicted at PU, the second AND gate 69a calculates an AND of the first word boundary signal WB1 and the first set page-over signal PU to produce the second AND'ed signal. The second AND'ed signal is delivered to the second OR gate depicted at 77a. Supplied with the second set page-over signal which is produced by the second page-over flip-flop 72 and is depicted at PL, the first word-over signal WO1 produced by the first adder 65a, and the third word-over signal WO3 produced by the second adder 65b, the eighth AND gate 98 calculates an AND of the second set page-over signal PL, the first word-over signal WO1, and the third word-over signal WO3 to produce an eighth AND'ed signal. The eighth AND'ed signal is sent to the second OR gate 77a. Supplied with the first set page-over signal PU produced by the first page-over flip-flop 71 and the second word-over signal WO2 produced by the second adder 65b, the ninth AND gate 99 calculates an AND of the first set page-over signal PU and the second word-over signal WO2 to produce a ninth AND'ed signal. The ninth AND'ed signal is delivered to the second OR gate 77a. The second OR gate 77a calculates an OR of the second AND'ed signal, the ninth AND'ed signal, and the eighth AND'ed signal to produce the second OR'ed signal. The second OR'ed signal is delivered as the selected page-over signal SPO to the page-over control circuit 95 (FIG. 14).

Figure 16:
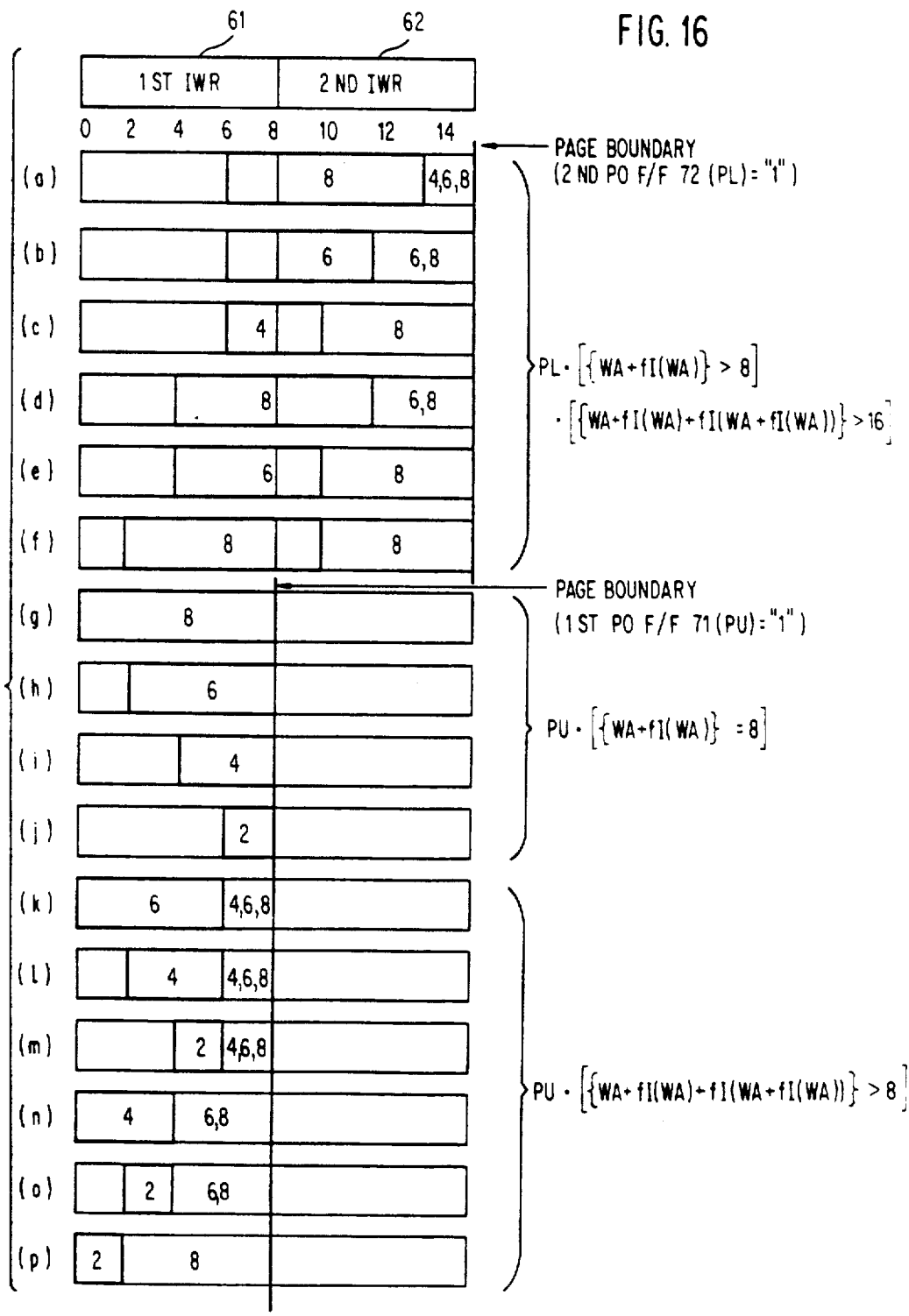
FIG. 16 is a view for use in describing operation of the instruction aligning circuit illustrated in FIG. 15.

Referring to FIG. 16, operation of the instruction aligning circuit 30a will be described. A first or top line in FIG. 16 illustrates the first and the second instruction word registers 61 and 62 for holding the first and the second held instruction words collectively as a collected instruction word of sixteen bytes which are arranged from the zeroth byte to a fifteenth byte as counted from the leftmost byte. First and sixteenth examples of the collected instruction word are depicted along second through seventeenth lines from the top at (a) to (p), respectively. In FIG. 16, each of upper and lower thick and long vertical solid line indicates a page boundary as labelled. Therefore, the page-over signal of the logic "1" level is loaded in one of the first and the second page-over flip-flops 71 and 72. The above-mentioned one of the first and the second page-over flip-flops 71 and 72 corresponds to one of the first and the second instruction word registers 61 and 62 that is located just on the left-hand side of the thick and long vertical solid lines. Each collected instruction word includes the page last instruction indicated by a thick solid-line rectangle. A numeral depicted in the thick solid-line rectangle indicates an instruction length of the page last instruction. Other numerals are depicted on each right-hand side of the page last instruction. Each of the other numerals indicates another instruction length of the page-over instruction which next follows the page last instruction.

For example, the first example (a) is the collected instruction word including the page last instruction of eight bytes arranged from the sixth byte to the thirteenth byte with the page last instruction accompanied by the page-over instruction which is one of four bytes, six bytes, and eight bytes long. Each of the seventh through the tenth examples (g) to (j) is the collected instruction word including the page last instruction accompanied by the page-over instruction which is any bytes long.

Description will be made as regards first through third conditions that the current instruction aligned by the instruction aligner 63 is the page last instruction.

Attention will at first be directed to the first condition in connection with the first through the sixth examples (a) to (f). In each of the first through the sixth examples (a) to (f), the second page-over flip-flop 72 produces the second set page-over signal PL of the logic "1" level. In addition, the first result of addition {WA+fl(WA)}, namely, a first sum of the held intra-word address WA and the current instruction length signal fl(WA) is greater than decimal eight. That is, the first adder 65a produces the first word-over signal WO1 of the logic "1" level. Moreover, the second result of addition {WA+fl(WA)+fl(WA+fl(WA))}, namely, a second sum of the held intra-word address WA, the current instruction length signal fl(WA), and the next instruction length signal fl(WA+fl(WA)) is greater than decimal sixteen. In other words, the second adder 65b produces the third word-over signal WO3 of the logic "1" level. Accordingly, the first condition indicates that all of the second set page-over signal PL, the first word-over signal WO1, and the third word-over signal WO3 are the logic "1" levels. The eighth AND gate 98 is for finding the first condition.

Attention will be directed to the second condition in connection with the seventh through the tenth examples (g) to (j). In each of the seventh through the tenth examples (g) to (j), the first page-over flip-flop 71 produces the first set page-over signal PU of the logic "1" level. Furthermore, the first sum {WA+fl(WA)} is equal to decimal eight. That is, the first adder 65a produces the first word boundary signal WB1 of the logic "1" level. As a result, the second condition indicates that both of the first set page-over signal PU and the first word boundary signal are the logic "1" levels. The second AND gate 69a is for finding the second condition.

Attention will be directed to the third condition in connection with the eleventh through the sixteenth examples (k) to (p). In each of the eleventh through the sixteenth examples (g) to (j), the first page-over flip-flop 71 produces the first set page-over signal PU of the logic "1" level. In addition, the second sum {WA+fl(WA)+fl(WA+fl(WA))} is greater than decimal eight. That is, the second adder 65b produces the second word-over signal WO2 of the logic "1" level. Therefore, the third condition indicates that both of the first set page-over signal PU and the second word-over signal WO2 are the logic "1" levels. The ninth AND gate 99 is for finding the third condition. The second OR gate 77a produces the selected page-over signal SPO when one of the first through the third conditions is found. In other words, the selected page-over signal SPO is produced in synchronism with production of the page last instruction as the current instruction by the instruction aligner 63.

Turning to FIG. 17, the page-over control circuit 95 comprises a fourth buffer gate 103, tenth and eleventh AND gates 104 and 105, a seventh flip-flop 106, and a third OR gate 107.

Responsive to the address translation instruction signal ATI supplied from the instruction decoding circuit 32a, the fourth buffer gates 103 produces a fourth noninverted output signal and a fourth inverted output signal from its noninverting and inverting output terminals, respectively. The fourth noninverted output signal and the fourth inverted output signal are delivered to the tenth and the eleventh AND gates 104 and 105, respectively. The tenth AND gate 104 calculates an AND of the fourth noninverted output signal and the selected page-over signal SPO supplied from the instruction aligning circuit 30a (FIG. 15) to produce a tenth AND'ed signal. The tenth AND'ed signal is sent to the seventh flip-flop 106. The eleventh AND gate 105 calculates an AND of the fourth inverted output signal and the selected page-over signal SPO to produce an eleventh AND'ed signal. The eleventh AND'ed signal is delivered to the third OR gate 107. The seventh flip-flop 102 holds the tenth AND'ed signal as a delayed page-over signal during one machine cycle. The delayed page-over signal is sent to the third OR gate 107. The delayed page-over signal is also delivered to the instruction decoding circuit 32a (FIG. 14) as the instruction supply suspension signal ISS. The third OR gate 107 calculates an OR of the delayed page-over signal and the eleventh AND'ed signal to produce a third OR'ed signal. The third OR'ed signal is delivered as the controlled page-over signal CPO to the first page-over area 36-2 of the second address information register 36 (FIG. 14).

With this structure, the selected page-over signal SPO of the logic "1" level is produced as the controlled page-over signal CPO of the logic "1" level when the address translation instruction signal ATI takes the logic "0" level. When the address translation instruction signal ATI takes the logic "1" level, the selected page-over signal SPO of the logic "1" level is delayed one machine cycle by the seventh flip-flops 106 and then is produced as the controlled page-over signal CPO of the logic "1" level. Simultaneously, the instruction supply suspension signal ISS of the logic "1" level is produced, lasting during one machine cycle. Responsive to the instruction supply suspension signal ISS of the logic "1" level, the instruction decoding circuit 32a (FIG. 14) delays supply of the page-over instruction following the last page instruction by one machine cycle. Therefore, the page-over control circuit 95 acts in combination with the instruction decoding circuit 32a as an instruction supply suspending arrangement for suspending supply of the page-over instruction during one machine cycle in response to the selected page-over signal SPO when the page last instruction is the address translation instruction.

As is apparent from the above, supply of the page last instruction from the instruction decoding circuit 32a to the operand address generating circuit 34 and supply of the controlled page-over signal CPO from the page-over control circuit 95 to the second address information register 36 are simultaneously carried out when the page last instruction is not the address translation instruction. When the page last instruction is the address translation instruction, the instruction decoding circuit 32a supplies the operand address generating circuit 34 with the page last instruction, suspends supply of the page-over instruction during one machine cycle with the controlled page-over signal supplied to the second address information register 36, and then supplies the operand address generating circuit 34 with the page-over instruction.

Figure 18B:
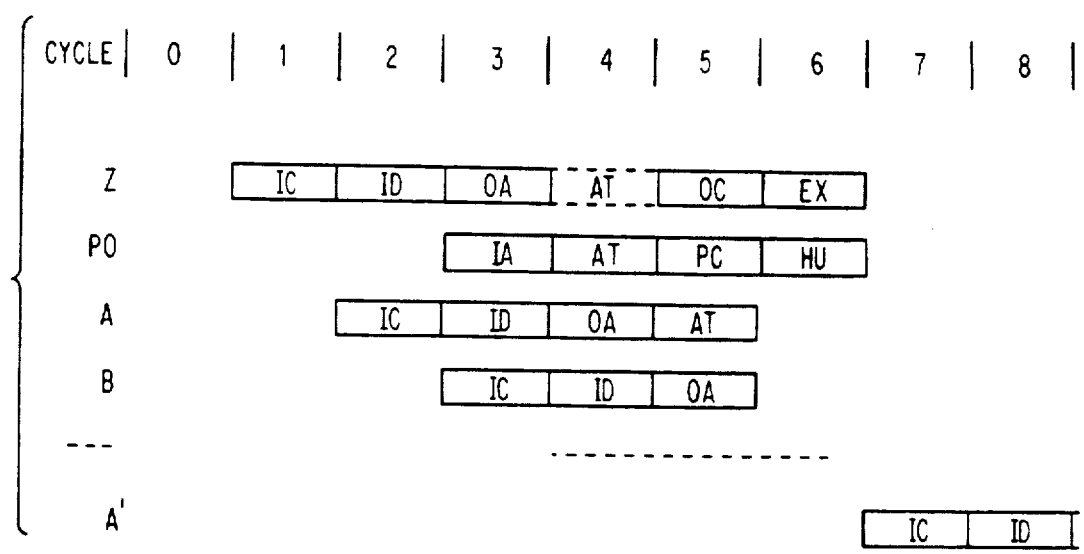
FIGS. 18(a) and (b) collectively show a time chart for use in describing operation of the data processing system depicted in FIG. 14.

Referring to FIGS. 18(a) and (b) in addition to FIG. 14, description will be made as regards an operation of the data processing system including the instruction prefetching device according to the second embodiment of the present invention in a case where execution is made as regards the array of instructions illustrated in FIG. 12. Zeroth through eighth machine cycles are indicated along a first or top line in each of FIGS. 18(a) and (b) by numerals 0 through 8. FIG. 18(a) is a time chart for use in describing operation of the data processing system illustrated in FIG. 14. FIG. 18(b) is another time chart for use in describing a flow of the array of instructions illustrated in FIG. 12. It will be presumed that the page last instruction is not the address translation instruction.

In the zeroth machine cycle, the page last real instruction address "4096n-8" is set in the instruction address register (IAR) 23 in the manner depicted along a second line from the top in FIG. 18(a). The history table 26 is addressed by the page last real instruction address to produce the current predicted page-over real instruction address "4096 m", the current page-over validity bit, and the table hit signal TH in the manner depicted along a third line from the top in FIG. 18(a). Simultaneously, the instruction address addition circuit 25 adds the page last real instruction address "4096n-8" to the read-out width "8" to produce the page-over signal PO in the manner depicted along a fourth line from the top in FIG. 18(a).

In the first machine cycle, the predicted page-over real instruction address "4096 m" is set in the instruction address register 23. At the same time, the last page instruction Z is supplied to the instruction aligning circuit 30a from the instruction memory circuit 21 through the instruction buffer 27 in the manner depicted along a second line from the top in FIG. 18(b).

In the second machine cycle, the page-over instruction A is supplied to the instruction aligning circuit 30a in the manner depicted along a fourth line from the top in FIG. 18(b). Concurrently, an aligning and decoding operation of the last page instruction Z is carried out by the instruction aligning circuit 30a and the instruction decoding circuit 32a in the manner depicted along a fifth line from the top in FIG. 18(a) and along the second line in FIG. 18(b). Inasmuch as the current instruction is the last page instruction Z, the selected page-over signal SPO is supplied to the page-over control circuit 95 in the manner depicted along a sixth line from the top in FIG. 18(a). Inasmuch as the last page instruction Z is not the address translation instruction, the address translation instruction signal ATI takes the logic "0" level and the page-over control circuit 95 produces the controlled page-over signal CPO of the logic "1" level in the manner depicted along seventh and eighth lines from the top in FIG. 18(a).

In the third machine cycle, an operand address generation of the last page instruction Z is carried out in the manner depicted along a ninth line from the top in FIG. 18(a) and along the second line in FIG. 18(b). Simultaneously, the controlled page-over signal CPO is held in the second page-over area 36-1 of the second address information register 36 as the second held page-over signal HPO2 in the manner depicted along a tenth line from the top in FIG. 18(a). The instruction address generating circuit 35 generates the page-over virtual address <A>' in the manner depicted along an eleventh line from the top in FIG. 18(a) and along a third line from the top in FIG. 18(b). The decoding operation of the page-over instruction A is carried out by the instruction decoding circuit 32 in the manner depicted along the fourth line in FIG. 18(b).

In the fourth machine cycle, the address translating circuit 39 does not carry out an address translation operation of the virtual operand address of the last page instruction Z in the manner depicted by dashed lines along the second line in FIG. 18(b). This is because the last page instruction Z is not the address translation instruction. Instead of the address translation operation for the last page instruction Z, the page-over virtual address <A>' is translated into an actual page-over real address a' by the address translating circuit 39 in the manner depicted along a twelfth line from the top in FIG. 18(a) and along the third line in FIG. 18(b). The operand address generating circuit 34 generates a virtual operand address of the page-over instruction A in the manner depicted along the fourth line in FIG. 13(b). The second held page-over signal HPO2, the page last real instruction address "4096n-8", and the predicted page-over real instruction address "4096m" are held in the third page-over area 38-2, the third prefetch address area 38-3, and the third predicted address area 38-5 of the third address information register 38, respectively, in the manner depicted along thirteenth through fifteenth lines from the top in FIG. 18(a).

In the fifth machine cycle, the operand reading circuit 22 reads an operand for the page last instruction Z from the operand memory circuit in the manner depicted along the second line in FIG. 18(b). The page last real instruction address "4096n-8" and the actual page-over real address a' are held in the actual prefetch address area 41-3 and the actual predicted address area 41-5 of the actual address information register 41, respectively, in the manner depicted along sixteenth and seventeenth lines from the top in FIG. 18(a). Confirmation of prediction (PC) is carried out by the prediction confirming circuit 40 in the manner depicted along the third line in FIG. 18(b). More specifically, the prediction confirming circuit 40 confirms whether or not the predicted page-over real instruction address "4096m" coincides with the actual page-over real address a'. If the predicted page-over real instruction address "4096m" coincides with the actual page-over real address a', the page-over instruction A, the instructions B, C and so on are successively executed by the instruction execution circuit 20 in the seventh machine cycle and machine cycles following the seventh machine cycle.

Otherwise, the prediction confirming circuit 40 produces the prediction failure signal PF in the manner depicted along an eighteenth line from the top in FIG. 18(a). Under the circumstances, the page-over instruction A and the instructions B, C and so on are cancelled in the next or the sixth machine cycle.

In the sixth machine cycle, the actual page-over real address a' is held in the prediction address register 44 in the manner depicted along a nineteenth line from the top in FIG. 18(a). Responsive to the prediction failure signal PF, the instruction prefetch control circuit 28 controls the request address selector 24 to make the request address selector 24 supply the instruction address register 23 with the page last real instruction address "4096n-8". When the history table 26 is accessed by the page last real instruction address, the write pulse renews the page-over real instruction address "4096m" in the history table 26 to the actual page-over real address a' in the manner depicted along the third line in FIG. 18(b).

In the seventh machine cycle, the instruction prefetch control circuit 28 controls the request address selector 24 to make the request address selector 24 supply the instruction address register 23 with the actual page-over real address a'.

As is apparent from the above, it takes no loss time to execute the page-over processing when the prediction of the page-over comes true. Otherwise, it takes a loss time of five machine cycles to execute the page-over processing.

Figure 19A:
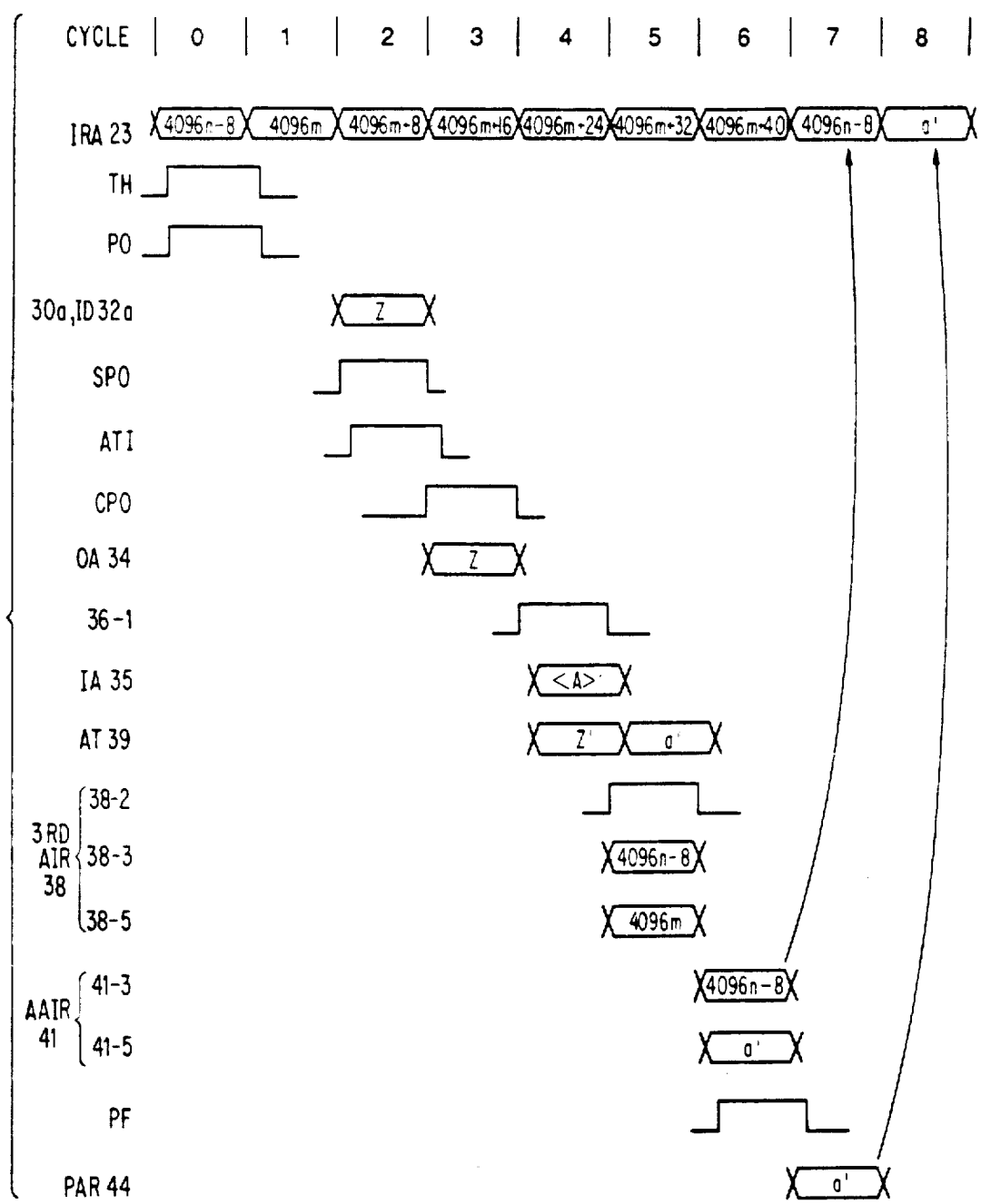
FIGS. 19(a) and (b) collectively show a time chart for use in describing another operation of the data processing system depicted in FIG. 14.

Referring to FIGS. 19(a) and (b) in addition to FIG. 14, description will be made as regards another operation of the data processing system including the instruction prefetching device according to the second embodiment of the present invention in the case where execution is made as regards the array of instructions illustrated in FIG. 12. The other operation is similar to that illustrated in FIGS. 18(a) and (b) except that the page last instruction Z is the address translation instruction. Therefore, description will be made as regards only differences between two operations.

In a second machine cycle, the instruction decoding circuit 32a produces the address translation instruction signal ATI of the logic "1" level when the instruction decoding circuit 32a decodes the page last instruction Z in the manner depicted along a seventh line from a top in FIG. 19(a). This is because the page last instruction Z is the address translation instruction. As a result, supply of the page-over instruction A is suspended during one machine cycle and the controlled page-over signal CPO is produced at a third machine cycle in the manner depicted along an eighth line from the top in FIG. 19(a).

Figure 19B:
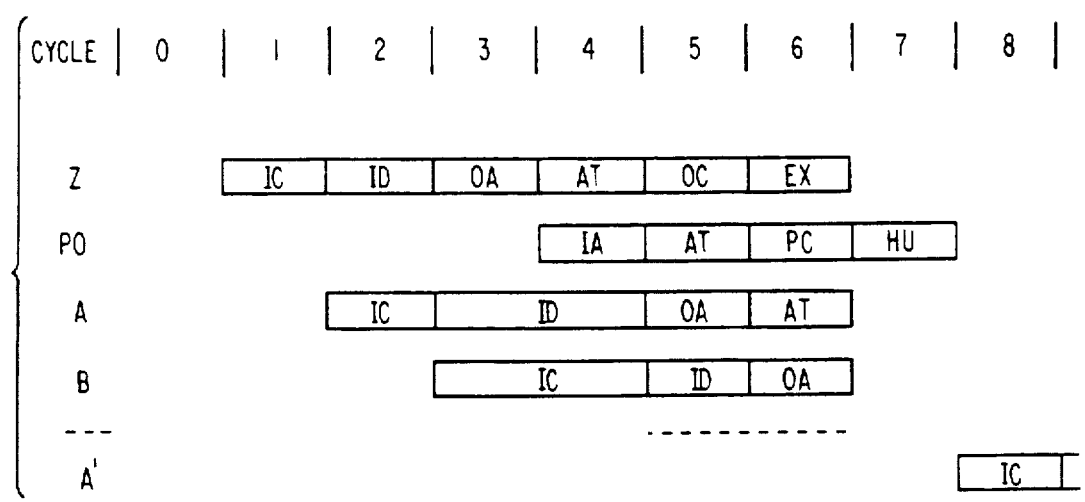

In a fourth machine cycle, the controlled page-over signal CPO is held in the first page-over area 36-1 of the second address information register 36 as the first held page-over signal HPO1 in the manner depicted along a tenth line from the top in FIG. 18(a). The instruction address generating circuit 35 generates the page-over virtual address $<A>'$ in the manner depicted along an eleventh line from the top in FIG. 18(a) and along a third line from the top in FIG. 18(b). The address translating circuit 39 carries out an address translation operation of a virtual operand address of the last page instruction Z into a real operand address Z' in the manner depicted along a twelfth line from the top in FIG. 19(a). The decoding operation of the page-over instruction A is carried out by the instruction decoding circuit 32 in the manner depicted along a fourth line in FIG. 19(b).

In a fifth machine cycle, the first held page-over signal HPO1, the page last real instruction address "4096n-8", and the page-over real instruction address "4096m" are held in the second page-over area 38-2, the third prefetch address area 38-3, and the third predicted address area 38-5 of the third address information register 38, respectively, in the manner depicted along thirteenth through fifteenth lines from the top in FIG. 19(a). The page-over virtual address $<A>'$ is translated into an actual page-over real address a' by the address translating circuit 39 in the manner depicted along the twelfth line in FIG. 19(a) and along the second line in FIG. 19(b).

In a sixth machine cycle, the page last real instruction address "4096n-8" and the actual page-over real address a' are held in the actual prefetch address area 41-3 and the actual predicted address area 41-5 of the actual address information register 41, respectively, in the manner depicted along sixteenth and seventeenth lines from the top in FIG. 19(a). Confirmation of prediction (PC) is carried out by the prediction confirming circuit 40 in the manner depicted along a third line in FIG. 19(b). If the prediction is correct, the page-over instruction A and the instructions B, C and so on are successively executed by the instruction execution circuit 20 in the eighth machine cycle and machine cycles following the eighth machine cycle. Otherwise, the prediction confirming circuit 40 produces the prediction failure signal PF in the manner depicted along an eighteenth line from the top in FIG. 19(a). Under the circumstances, the page-over instruction A and the instructions B, C and so on are cancelled in the next or the seventh machine cycle.

In a seventh machine cycle, the actual page-over real address a' is held in the prediction address register 44 in the manner depicted along a nineteenth line from the top in FIG. 19(a). Responsive to the prediction failure signal PF, the instruction prefetch control circuit 28 controls the request address selector 24 to make the request address selector 24 supply the instruction address register 23 with the page last real instruction address "4096n-8". When the history table 26 is accessed by the page last real instruction address "4096n-8", the write pulse renews the page-over real instruction address "4096m" in the history table 26 to the actual page-over real address a' in the manner depicted along the third line in FIG. 19(b).

In the eighth machine cycle, the instruction prefetch control circuit 28 controls the request address selector 24 to make the request address selector 24 supply the instruction address register 23 with the actual page-over real address a'.

As is apparent from the above, it takes a loss time of one machine cycle to execute the page-over processing when the prediction of the page-over comes true. Otherwise, it takes another loss time of six machine cycles to execute the page-over processing.

As is apparent from the above, the page-over instruction A is processed immediately after processing in the page-over no matter whether or not the page last instruction is the address translation instruction. As a result, cancellation is made as regards the instructions which follow the page-over processing when prediction fault is detected by the prediction confirming circuit 40. Therefore, it never occurs that either any necessary instruction is cancelled or instructions to be cancelled are not cancelled. Accordingly, minimum instructions are always cancelled.

It is experimentally proved that the hit rate of the prediction of the page-over processing is about ninety percent and an appearance rate of the address translation instruction is about twenty-five percent. The appearance rate indicates probability of appearance of the address translation instruction. In order to execute the page-over processing in the second embodiment, it takes an average loss time of machine cycles given by:

$$(0 \times 0.9 + 5 \times 0.1) \times 0.25 + (1 \times 0.9 + 6 \times 0.1) \times 0.75 = 1.25$$

In contrast, it takes a loss time of four machine cycles to execute the page-over processing in the conventional instruction prefetching device such as that disclosed by Hanatani et al. Therefore, the instruction prefetching device of the second embodiment can execute the page-over processing at the average loss time shorter than that of the conventional instruction prefetching device by 2.75 machine cycles.

What is claimed is:

1. An instruction prefetching device for use in a data processing system including an instruction executing circuit, said instruction prefetching device arranged for successively prefetching each of program instructions as a prefetched instruction prior to execution by said instruction executing circuit of a current instruction prefetched earlier than said prefetched instruction, said data processing system further including an instruction address generating circuit for generating a virtual instruction address of a next instruction which next follows said prefetched instruction and an address translating circuit for translating said virtual instruction address into an actual real address, said instruction prefetching device comprising an instruction memory circuit assigned with real instruction addresses and divided into a plurality of page frames for memorizing said program instructions as memorized instructions, said program instructions including page last instructions which are located at ends of the respective page frames and page-over instructions which follow the respective page last instructions, an instruction address register for holding said real instruction addresses one at a time as a prefetch real instruction address which belongs to one of said page frames that is used as a prefetch page frame, said instruction address register accessing said instruction memory circuit to produce one of said memorized instructions from said prefetch real instruction address as said prefetched instruction, wherein the improvement comprises:

a history table connected to said instruction address register for memorizing page last address specifying signals which specify the real instruction addresses of said page last instructions as page last real instruction addresses and the real instruction addresses of said page-over instructions as page-over real instruction addresses in correspondence to the respective page last real instruction addresses, said history table producing a table hit signal and a particular page-over real instruction address when said prefetch real instruction address coincides with one of said page last real instruction addresses, said particular page-over real instruction address indicating one of said page-over instructions that next follows one of said page last instructions indicated by said one of the page last real instruction addresses;

address supplying means connected to said history table and said instruction address register for supplying said instruction address register with said particular page-over real instruction address in response to said table hit signal as a next succeeding real instruction address which next follows said prefetch real instruction address to make said instruction memory circuit produce said one of the page-over instructions;

page-over detecting means connected to said instruction address register for detecting whether or not said next instruction becomes over said prefetch page frame in response to said prefetch real instruction address, said page-over detecting means producing a page-over signal when said next instruction becomes over said prefetch page frame;

page-over holding means connected to said page-over detecting means for holding said page-over signal as a held page-over signal;

actual predicted address holding means connected to said address translating circuit for holding said actual real address as an actual predicted address;

page-over instruction address holding means connected to said history table for holding said particular page-over real instruction address as a held prediction instruction address;

prediction confirming means connected to said page-over instruction address holding means, to said address translating circuit, and to said page-over holding means for confirming whether or not said held prediction instruction address coincides with said actual real address in response to said held page-over signal, said prediction confirming means producing a prediction failure signal when said held prediction instruction address does not coincide with said actual real address; and renewing means connected to said actual predicted address holding means, to said history table, and to said prediction confirming means for renewing said particular page-over real instruction address to said actual predicted address in response to said prediction failure signal as a new page-over real instruction address.

2. An instruction prefetching device as claimed in claim 1, said program instructions including address translation instructions to which address translation is necessary, wherein said instruction prefetching device further comprises instruction supply suspending means connected to said instruction memory circuit and to said page-over detecting means for suspending supply of said next instruction during one machine cycle in response to said page-over signal when said prefetched instruction is one of said page last instruction and furthermore when said prefetched instruction is one of said address when said prefetched instruction is one of said address translation instructions.

* * * * *